(12) United States Patent
Kuehne et al.

(10) Patent No.: US 12,011,814 B2
(45) Date of Patent: Jun. 18, 2024

(54) MULTISPEED POWER TOOL

(71) Applicant: BLACK & DECKER INC., New Britain, CT (US)

(72) Inventors: Brent A. Kuehne, Red Lion, PA (US); Jianhua Chen, Suzhou (CN); Jian Gao, Suzhou (CN); Wen Zhu, Zhangjiagang (CN); Guoquing Wang, Jiangsu (CN)

(73) Assignee: BLACK & DECKER INC., New Britain, CT (US)

( * ) Notice: Subject to any disclaimer, the term of this patent is extended or adjusted under 35 U.S.C. 154(b) by 118 days.

(21) Appl. No.: 17/345,577

(22) Filed: Jun. 11, 2021

(65) Prior Publication Data
US 2021/0299841 A1 Sep. 30, 2021

Related U.S. Application Data

(63) Continuation of application No. 15/986,999, filed on May 23, 2018, now Pat. No. 11,059,160, which is a
(Continued)

(51) Int. Cl.
 *B25F 5/00* (2006.01)
 *B23B 45/00* (2006.01)
(52) U.S. Cl.
 CPC ............ *B25F 5/001* (2013.01); *B23B 45/008* (2013.01); *B23B 2260/044* (2013.01)
(58) Field of Classification Search
 CPC . F16H 3/44; E21B 19/18; B25F 5/001; B23B 45/008; B23B 2260/044
(Continued)

(56) References Cited

U.S. PATENT DOCUMENTS 2,978,921 A   4/1961   Donohoe
3,162,250 A   12/1964  Sindelar
(Continued)

FOREIGN PATENT DOCUMENTS

CN   203202166 U   9/2013
DE   19705378 A1   8/1997
(Continued)

OTHER PUBLICATIONS

Photographs of DeWalt DC725 drill believed to be publically available and/or for sale in 2007.
(Continued)

*Primary Examiner* — Robert F Long
*Assistant Examiner* — Xavier A Madison
(74) *Attorney, Agent, or Firm* — Stephen R. Valancius

(57) ABSTRACT

A tool with a transmission assembly having a reduction gearset and a speed selector. The speed selector has a member, an actuator and a shifter assembly. The member is movable between a first position, in which the member is non-rotatable, and a second position in which the member is coupled to a planet carrier of the reduction gearset for common rotation. The actuator includes a pivoting yoke and a follower that is coupled to the yoke. The follower engages the member so as to be axially movable with the follower. The shifter assembly has a selector switch, a switch fork, and a pair of springs. The selector switch is slidable between a first switch position and a second switch position. The switch fork is slidably coupled to the selector switch and receives the yoke. The springs cooperate to bias the switch fork relative to the selector switch into a neutral position.

10 Claims, 18 Drawing Sheets

Related U.S. Application Data continuation-in-part of application No. 15/337,236, filed on Oct. 28, 2016, now Pat. No. 10,464,201, which is a continuation of application No. 13/220,164, filed on Aug. 29, 2011, now Pat. No. 9,481,080.

(60) Provisional application No. 61/513,206, filed on Jul. 29, 2011.

(58) Field of Classification Search
USPC ........................................................ 173/216
See application file for complete search history.

(56) References Cited

U.S. PATENT DOCUMENTS

| | | |
|---|---|---|
| 3,972,106 A | 8/1976 | Orr |
| 4,253,554 A | 3/1981 | Nisenson |
| 4,493,223 A * | 1/1985 | Kishi .................... B23B 45/02 74/369 |
| 4,676,126 A | 6/1987 | Polastri |
| 4,706,791 A | 11/1987 | Magliano |
| 4,791,833 A | 12/1988 | Sakai et al. |
| 4,989,374 A | 2/1991 | Rudolf et al. |
| 5,016,501 A | 5/1991 | Holzer, Jr. |
| 5,340,245 A | 8/1994 | Bloechle et al. |
| 5,788,021 A | 8/1998 | Tsai |
| 5,792,020 A | 8/1998 | Kikuchi et al. |
| 5,824,491 A | 10/1998 | Priest |
| 5,947,254 A | 9/1999 | Jones |
| 5,984,022 A | 11/1999 | Harman, Jr. et al. |
| 6,070,675 A | 6/2000 | Mayer et al. |
| 6,142,242 A | 11/2000 | Okumura et al. |
| 6,213,224 B1 | 4/2001 | Furuta et al. |
| 6,279,714 B1 | 8/2001 | Hsu |
| 6,311,787 B1 | 11/2001 | Berry et al. |
| 6,431,289 B1 | 8/2002 | Potter et al. |
| 6,435,285 B1 | 8/2002 | Tsai |
| 6,497,316 B1 | 12/2002 | Hsu |
| 6,502,648 B2 | 1/2003 | Milbourne |
| 6,655,470 B1 | 12/2003 | Chen |
| 6,676,557 B2 | 1/2004 | Milbourne et al. |
| 6,715,562 B1 | 4/2004 | Chen |
| 6,729,812 B2 | 5/2004 | Yaksich et al. |
| 6,796,921 B1 | 9/2004 | Buck et al. |
| 6,805,207 B2 | 10/2004 | Hagan et al. |
| 6,857,983 B2 | 2/2005 | Milbourne et al. |
| 6,866,607 B2 | 3/2005 | Nishiji et al. |
| 6,984,188 B2 | 1/2006 | Potter et al. |
| 7,008,151 B2 | 3/2006 | Yaksich et al. |
| 7,066,691 B2 | 6/2006 | Doyle et al. |
| 7,073,606 B2 | 7/2006 | Mamber et al. |
| 7,101,300 B2 | 9/2006 | Milbourne et al. |
| 7,201,235 B2 | 4/2007 | Umemura et al. |
| 7,220,211 B2 | 5/2007 | Potter et al. |
| 7,223,195 B2 | 5/2007 | Milbourne et al. |
| 7,287,602 B2 | 10/2007 | Zeiter et al. |
| 7,308,948 B2 | 12/2007 | Furuta |
| 7,314,097 B2 | 1/2008 | Jenner et al. |
| 7,380,612 B2 | 6/2008 | Furuta |
| 7,380,613 B2 | 6/2008 | Furuta |
| 7,395,874 B2 | 7/2008 | Zeiter |
| 7,404,781 B2 | 7/2008 | Milbourne et al. |
| 7,410,441 B2 | 8/2008 | Milbourne et al. |
| 7,452,304 B2 | 11/2008 | Hagan et al. |
| 7,455,615 B2 | 11/2008 | Chen |
| 7,494,437 B2 | 2/2009 | Chen |
| 7,513,845 B2 | 4/2009 | Ho |
| 7,537,064 B2 | 5/2009 | Milbourne et al. |
| 8,066,611 B2 | 11/2011 | Spielmann et al. |
| 8,251,158 B2 | 8/2012 | Tomayko et al. |
| 8,485,275 B2 | 7/2013 | Kuroyangi et al. |
| 8,485,935 B2 | 7/2013 | Hecht et al. |
| 8,760,102 B2 | 6/2014 | Hirabayashi |
| 8,820,433 B2 | 9/2014 | Kuehne et al. |
| 8,919,217 B2 | 12/2014 | Hecht et al. |
| 8,968,147 B2 | 3/2015 | Hecht et al. |
| 9,108,306 B2 | 8/2015 | Hecht et al. |
| 9,217,492 B2 | 12/2015 | Kierspe et al. |
| 9,481,080 B2 | 11/2016 | Kuehne |
| 9,486,909 B2 | 11/2016 | Zieger et al. |
| 9,494,200 B2 | 11/2016 | Kelleher et al. |
| 9,636,818 B2 | 5/2017 | Kierspe et al. |
| 2002/0098938 A1 * | 7/2002 | Milbourne ................ F16H 3/64 475/286 |
| 2005/0022358 A1 | 2/2005 | Hagan et al. |
| 2005/0028997 A1 | 2/2005 | Hagan et al. |
| 2005/0061524 A1 | 3/2005 | Hagan et al. |
| 2005/0070399 A1 | 3/2005 | Redfield |
| 2006/0276114 A1 | 12/2006 | Gallagher et al. |
| 2007/0201748 A1 | 8/2007 | Bixler et al. |
| 2007/0267207 A1 | 11/2007 | Ito |
| 2008/0098842 A1 | 5/2008 | Spielmann et al. |
| 2008/0173459 A1 | 7/2008 | Kuroyanagi et al. |
| 2008/0302550 A1 | 12/2008 | Erhardt |
| 2009/0003950 A1 | 1/2009 | Mok et al. |
| 2009/0065227 A1 | 3/2009 | Lin |
| 2009/0065277 A1 | 3/2009 | Lin |
| 2009/0098971 A1 | 4/2009 | Ho et al. |
| 2009/0101376 A1 | 4/2009 | Walker et al. |
| 2009/0160371 A1 | 6/2009 | Nagaki et al. |
| 2009/0173510 A1 | 7/2009 | Milbourne et al. |
| 2009/0200053 A1 | 8/2009 | Scrimshaw et al. |
| 2009/0200758 A1 | 8/2009 | Lam et al. |
| 2009/0208827 A1 | 8/2009 | Kondo |
| 2009/0272553 A1 * | 11/2009 | Engelfried .............. B25F 5/006 173/162.2 |
| 2010/0163261 A1 | 7/2010 | Tomayko et al. |
| 2010/0193207 A1 * | 8/2010 | Mok .................... B25D 11/106 173/48 |
| 2010/0200257 A1 | 8/2010 | Scrimshaw et al. |
| 2011/0000692 A1 | 1/2011 | Roehm |
| 2013/0025899 A1 | 1/2013 | Kuehne |
| 2013/0047762 A1 | 2/2013 | Hecht et al. |
| 2014/0116740 A1 | 5/2014 | Roehm et al. |
| 2015/0000950 A1 | 1/2015 | Blum et al. |
| 2015/0000951 A1 | 1/2015 | Hecht et al. |
| 2016/0199971 A1 * | 7/2016 | Moessnang ............. B25F 5/001 173/216 |
| 2016/0250742 A1 | 9/2016 | Kuehne |
| 2017/0043472 A1 | 2/2017 | Kuehne |

FOREIGN PATENT DOCUMENTS

| | | |
|---|---|---|
| DE | 102009000065 A1 | 7/2010 |
| DE | 102015119987 A1 | 5/2017 |
| EP | 1946895 A1 | 7/2008 |
| EP | 2338647 | 6/2011 |
| EP | 2551064 A2 | 1/2013 |
| GB | 2382388 A | 5/2003 |
| GB | 2392403 A | 3/2004 |
| JP | 61-025705 | 2/1986 |
| JP | S626224584 A | 10/1987 |
| JP | H05248499 A | 9/1993 |
| JP | 2005-118961 | 5/2005 |
| JP | 2009184038 A | 8/2009 |
| WO | 20130156242 A1 | 10/2013 |

OTHER PUBLICATIONS

Hitachi Electric Tool Parts List for Cordless Driver Drill Model DS 13DV2 (Mar. 15, 1996).

Van Woerden, N.—Communication Pursuant to Article 94(3) EPC re European Patent Application No. 12178215.5-1019—dated Feb. 15, 2019—4 pages.

Matzdorf, Udo—Extended European Search Report re: corresponding European Patent Appln. No. 19170612.6-1019—dated Sep. 17, 2019—8 pages—European Patent Office—Munich.

EP Search Report for EP Application No. 12178215.5 dated Jun. 25, 2018.

U.S. Appl. No. 15/986,999, filed May 23, 2018, Patented.
U.S. Appl. No. 15/337,236, filed Oct. 28, 2016, Patented.

(56) References Cited

OTHER PUBLICATIONS

U.S. Appl. No. 13/220,164, filed Aug. 29, 2011, Patented.

* cited by examiner

MULTISPEED POWER TOOL

CROSS-REFERENCE TO RELATED APPLICATIONS

This application is a continuation of U.S. patent application Ser. No. 15/986,999, entitled MULTISPEED POWER TOOL, filed May 28, 2018, now pending, which is a continuation-in-part of U.S. patent application Ser. No. 15/337,236, entitled MULTISPEED POWER TOOL, filed Oct. 28, 2016, now U.S. Pat. No. 10,464,201, which is a continuation of U.S. patent application Ser. No. 13/220,164, entitled MULTISPEED POWER TOOL, filed Aug. 29, 2011, now U.S. Pat. No. 9,481,080, which claims the benefit of U.S. Provisional Application No. 61/860,987, filed on Jul. 29, 2011, each of which is hereby incorporated by reference in their entirety.

FIELD

The present disclosure relates to a multispeed power tool.

BACKGROUND

Various multispeed power tools are known in the art. Several of the known arrangements suffer from one or more drawbacks, including difficulties in shifting the tool to operate in a different overall gear reduction ratio, and/or a relatively high part count in the tool. Accordingly, there remains a need in the art for an improved multispeed power tool.

SUMMARY

In one form, the present teachings provide a tool with a housing assembly and a transmission assembly. The housing assembly defines a handle. The transmission assembly is received in the housing assembly and includes a reduction gearset and a speed selector mechanism. The reduction gearset has a plurality of planetary stages. The speed selector mechanism has a movable member, an actuator and a shifter assembly. The movable member is movable parallel to a longitudinal axis of the transmission assembly between a first position, in which the movable member is non-rotatably coupled to the housing assembly, and a second position in which the movable member is coupled to a planet carrier of the reduction gearset for common rotation. The actuator includes a yoke, which is pivotally coupled to the housing assembly, and a follower that is coupled to the yoke. The follower engages the movable member so as to be axially movable with the follower. The shifter assembly has a selector switch, a switch fork, and a pair of biasing springs. The selector switch is slidably mounted to the housing assembly and movable between a first switch position and a second switch position. The switch fork is slidably coupled to the selector switch and receives the yoke. The biasing springs cooperate to bias the switch fork relative to the selector switch into a neutral position.

In another form, the present disclosure provides a tool that includes a housing assembly and a transmission assembly. The housing assembly defines a handle and includes a gearcase. The transmission assembly is wholly received in the gearcase and has a reduction gearset and a thrust washer. The reduction gearset has a movable member that is selectively movable between a first position, in which the transmission assembly operates in a first overall gear ratio, and a second position in which the transmission assembly operates in a second overall gear ratio. The housing assembly further includes a ring structure that is non-rotatably coupled to the gearcase. The ring structure has a plurality of teeth and a plurality of bosses that are received in longitudinal grooves formed in the gearcase. The movable member has locking teeth that engage the teeth of the ring structure when the movable member is in the second position.

In still another form, the teachings of the present disclosure provide a tool that includes a housing assembly, which defines a handle, and a transmission assembly that is received in the housing assembly. The transmission assembly has a reduction gearset and a thrust washer. The reduction gearset has a first ring gear and is selectively operable in a first overall gear ratio and a second overall gear ratio. The thrust washer limits axial movement of the first ring gear in a predetermined direction. A movable member in the transmission assembly non-rotatably engages the thrust washer when the transmission assembly is operated in the first overall gear ratio.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
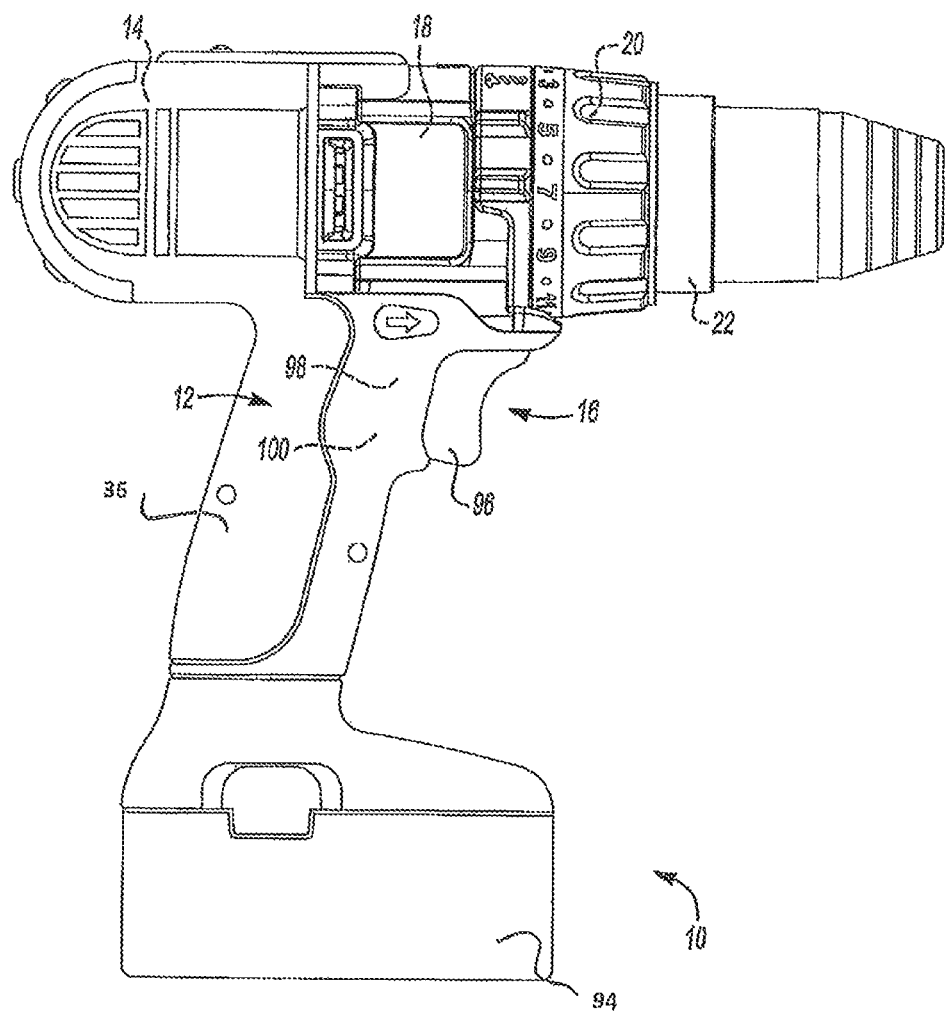
FIG. 1 is a side elevation view of an exemplary tool constructed in accordance with the teachings of the present disclosure.
Figure 2:
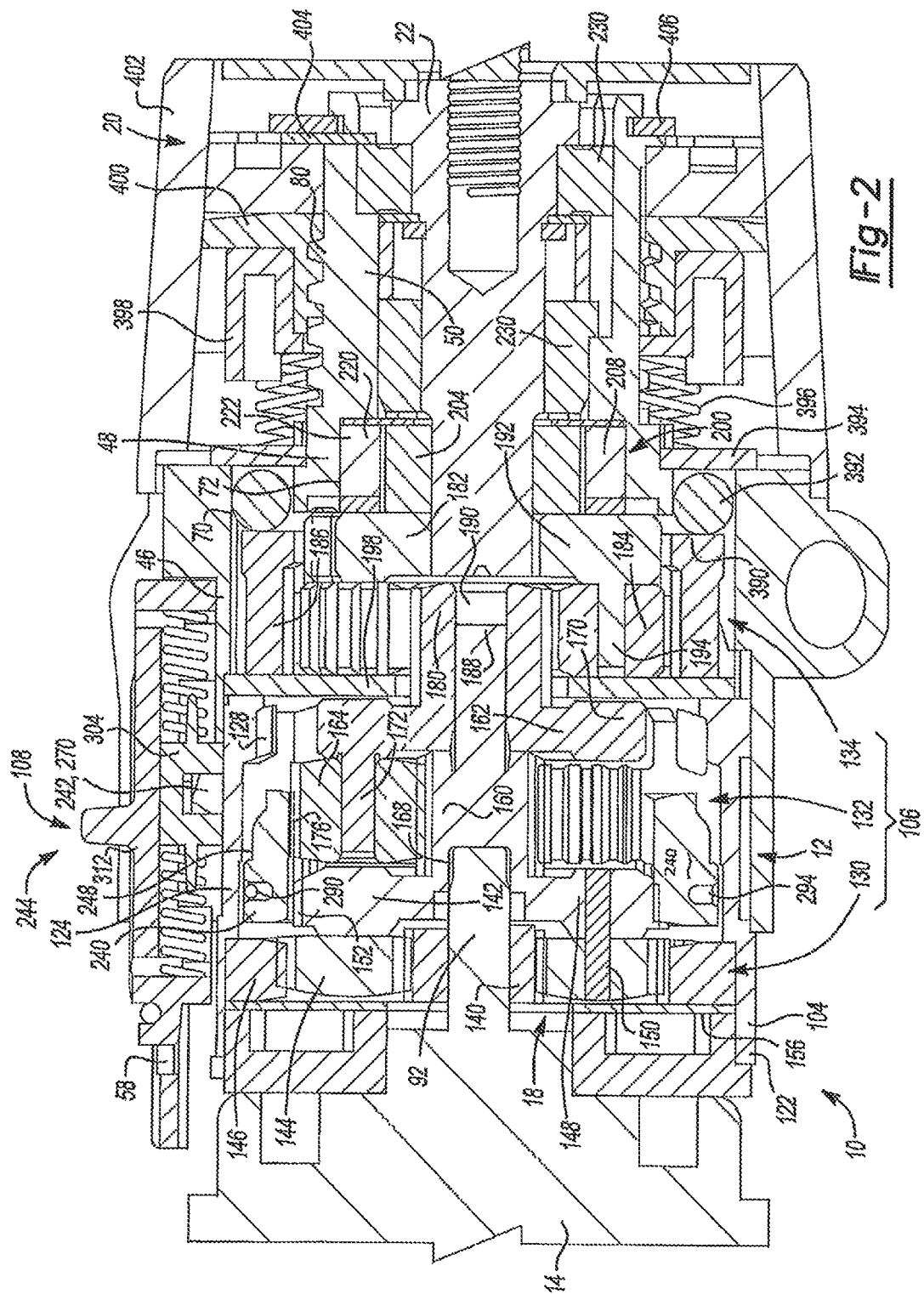
FIG. 2 is a longitudinal section view of a portion of the tool of FIG. 1.

With reference to FIGS. 1 and 2, an exemplary tool constructed in accordance with the teachings of the present disclosure is generally indicated by reference numeral 10. The tool 10 can include a housing assembly 12, a motor assembly 14, a trigger assembly 16, a transmission assembly 18, a clutch assembly 20 and an output spindle 22.

The housing assembly 12 can comprise a pair of handle housing shells 30 and a gear case 32 that can be removably coupled to the handle housing shells 30 via a plurality of threaded fasteners (not shown). The handle housing shells 30 can cooperate to define a handle 36, a trigger mount 38, and a cavity 40 into which the motor assembly 14 can be received.

Figure 3:
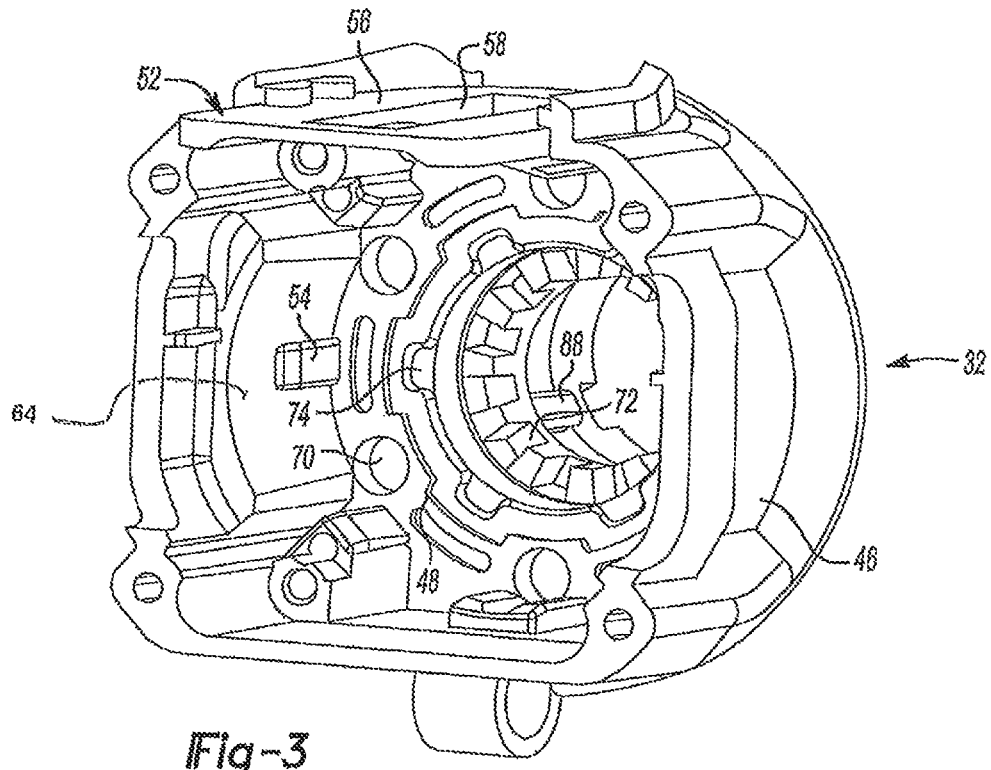
FIG. 3 is a rear perspective view of a portion of the tool of FIG. 1 illustrating a gear case in more detail.
Figure 4:
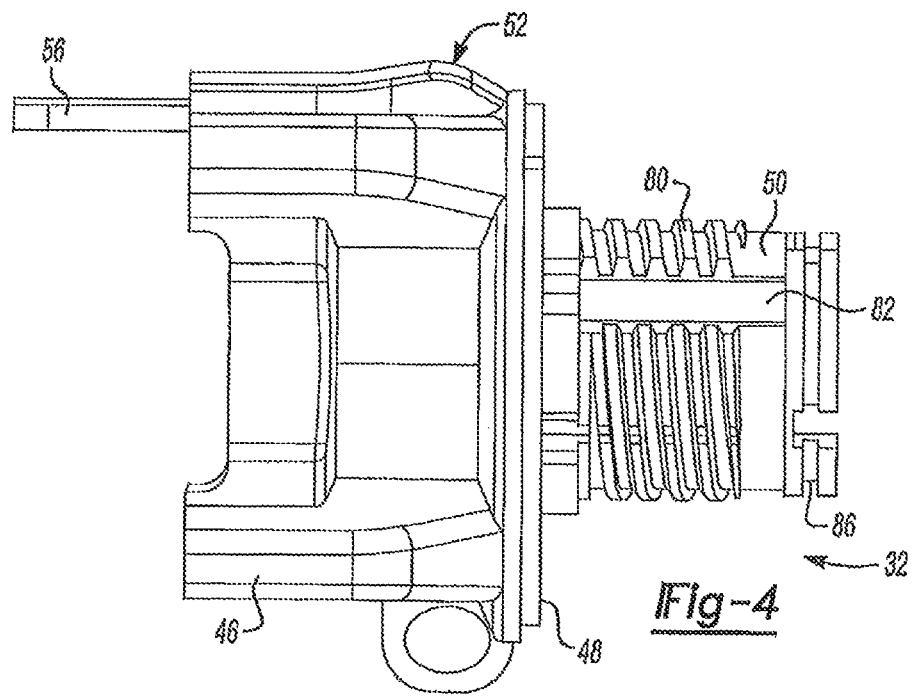
FIG. 4 is a right side elevation view of the gear case shown in FIG. 3.
Figure 9:
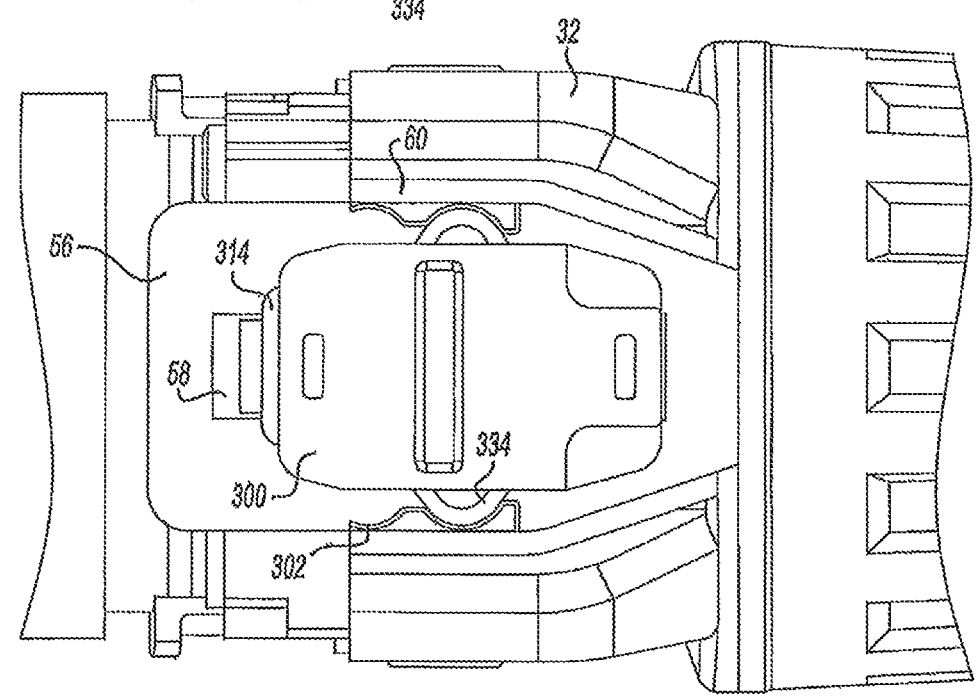
FIG. 9 is a partly broken away top plan view of the tool of FIG. 1.

With reference to FIGS. 2 through 4, the gear case 32 can form at least a portion of an exterior of the tool 10 and can include a first wall 46, a shoulder wall 48 and a second wall 50. The first wall 46 can be a generally tubular structure that can have a shifter mount 52 and a pair of guide channels 54 (see FIG. 4—only one shown). The shifter mount 52 can define a shifter tongue 56, which can extend generally parallel to a longitudinal axis of the gear case 32 and can be received into a slot (not shown) formed in the handle housing shells 30 (FIG. 1), a shifter aperture 58, which can extend through the shifter tongue 56 and can be disposed generally parallel to a longitudinal axis of the gear case 32, and a detent mount 60 (FIG. 9). The guide channels 54 can be positioned on the interior surface 64 of the first wall 46 generally parallel to the longitudinal axis of the gear case 32 and generally perpendicular to the shifter aperture 58 so that the shifter aperture 58 is disposed between the guide channels 54. The shoulder wall 48 can be an annular structure that can couple the first and second walls 46 and 50 to one another. In the example provided, the shoulder wall 48 extends radially outward from the second wall 50 to the first wall 46. The shoulder wall 48 can define a set of clutch element apertures 70, a central bore 72 and a plurality of locking lugs 74. The clutch element apertures 70 can be disposed radially outwardly of the second wall 50 and can extend through the shoulder wall 48 so as to terminate within the interior of the first wall 46. The locking lugs 74 can be formed on an axial end of the shoulder wall 48 so as to face the interior volume defined by the first wall 46. The second locking lugs 74 can be disposed radially between the central bore 72 and the clutch element apertures 70. The second wall 50 can be a generally tubular structure that can extend axially from the shoulder wall 48 on a side opposite the first wall 46. The second wall 50 can have an externally threaded portion 80, a keyway 82, a retaining ring groove 86 and a key 88. The keyway 82 can be disposed on the exterior of the second wall 50 and can extend longitudinally through the threaded portion 80. The retaining ring groove 86 can be formed in the exterior of the second wall 50 on an end of the second wall 50 opposite the shoulder wall 48. The key 88 can be formed on the interior of the second wall 50 and can extend in a longitudinal direction that is parallel to the longitudinal axis of the gear case 32.

The motor assembly 14 and the trigger assembly 16 can be conventional in their construction and operation. In brief, the motor assembly 14 can include an output shaft 92 that can provide a rotary input (torque) to the transmission assembly 18, while the trigger assembly 16 can be mounted to the trigger mount 38 and employed to selectively couple the motor assembly 14 to a source of electrical power, such as a battery pack 94. In the example provided, the trigger assembly 16 includes a trigger 96, a trigger switch 98, and a reversible variable speed controller 100, but it will be appreciated that various other types of trigger assemblies could be substituted for the particular trigger assembly that is shown in the drawings and described herein.

Figure 5:
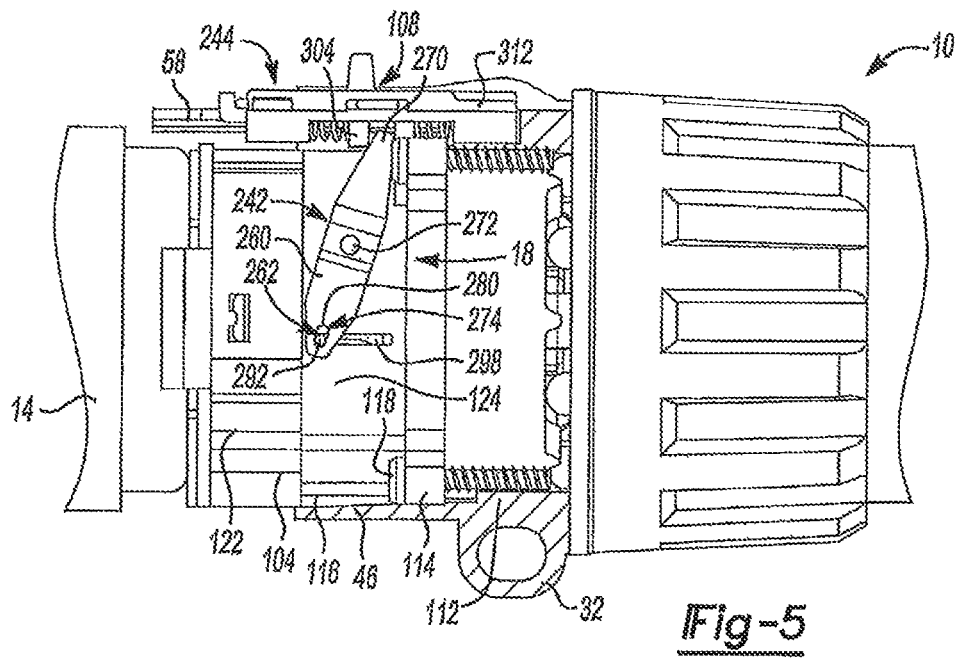
FIG. 5 is a partly sectioned right side elevation view of a portion of the tool of FIG. 1.
Figure 6:
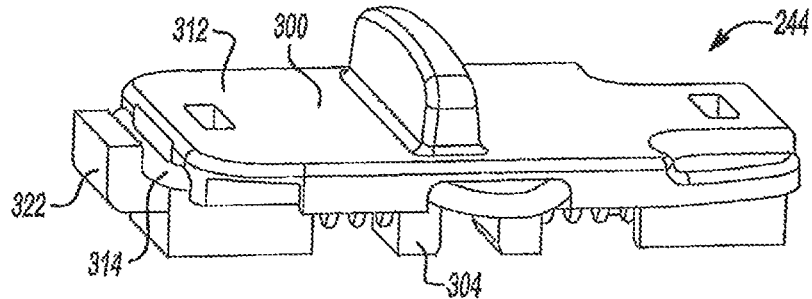
FIG. 6 is a top perspective view of a portion of the tool of FIG. 1 illustrating a shifter assembly in detail.
Figure 7:
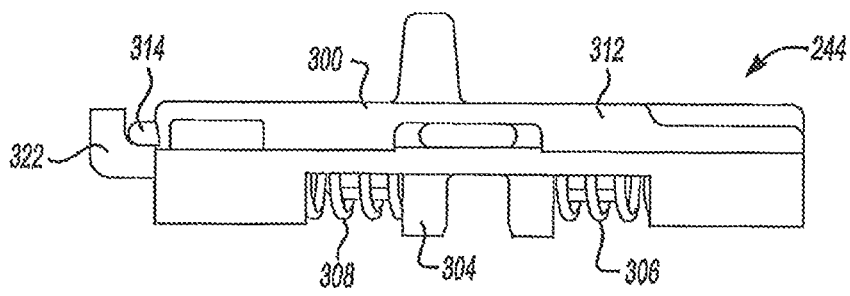
FIG. 7 is a right side elevation view of the shifter assembly shown in FIG. 6.

With reference to FIGS. 2 and 5, the transmission assembly 18 can be configured to transmit rotary power between the motor assembly 14 and the output spindle 22 and can comprise a transmission sleeve 104, a reduction gearset 106 and a speed selector mechanism 108.

The transmission sleeve 104 can be a tubular structure that can be formed of a suitable material, such as plastic, and can be axially and non-rotatably coupled to the gear case 32 in any desired manner. In the particular example provided, both the first wall 46 of the gear case 32 and the transmission sleeve 104 have a plurality of circumferentially spaced-apart bosses 112 and 114, respectively, that axially abut one another. The bosses 114 on the transmission sleeve 104 can be matingly received in corresponding longitudinally extending grooves 116 formed on the interior surface of the first wall 46 such that receipt of the bosses 114 in the grooves 116 inhibits rotation of the transmission sleeve 104 relative to the gear case 32. Additionally or alternatively, fasteners can be employed to non-rotatably couple and optionally fixedly couple the transmission sleeve 104 to the first wall 46. In the example provided, the fasteners comprise threaded fasteners 118 that extend through the bosses 114 in the transmission sleeve 104 and threadably engage the bosses 112 in the first wall 46, but it will be appreciated that various other types of fasteners, including rivets or pins, could be employed to fixedly couple the transmission sleeve 104 to the first wall 46.

The transmission sleeve 104 can include a first sleeve portion 122 and a second sleeve portion 124. The first sleeve portion 122, which can be disposed adjacent the motor assembly 14, can be formed with a non-circular lateral cross-sectional shape, such as a toothed shape, and can be somewhat larger in diameter than the second sleeve portion 124. A plurality of teeth 128 formed on an interior cylindrical surface of the second sleeve portion 124 on an axial end thereof opposite the end to which the first sleeve portion 122 abuts.

The reduction gearset 106 can be a multi-speed gearset and in the particular example provided, comprises a three-stage, two-speed planetary transmission having a first stage 130, a second stage 132 and a third stage 134. The first and second stages 130 and 132 can be disposed in the transmission sleeve 104, while the third stage 134 can be disposed in the gear case 32.

The first stage 130 can comprise a first sun gear 140, which can be coupled to the output shaft 92 of the motor assembly 14 for rotation therewith, a first planet carrier 142, a plurality of first planet gears 144 and a first ring gear 146. The first planet carrier 142 can comprise a first carrier body 148 and a plurality of first pins 150 that are fixedly coupled to and extend from the first carrier body 148. The first carrier body 148 comprises a plurality of first locking teeth 152 that can be disposed on an outer circumferential surface of the first carrier body 148. Each of the first planet gears 144 can be rotatably disposed on a corresponding one of the first pins 150 and can have teeth that are meshingly engaged with teeth of the first sun gear 140 and teeth of the first ring gear 146. The first ring gear 146 can be non-rotatably coupled to the transmission sleeve 104. In the example provided, the first ring gear 146 has a lateral cross-sectional shape that is complementary to the lateral cross-sectional shape of the first sleeve portion 122 so that the first ring gear 146 is non-rotatably coupled to the transmission sleeve 104 when it is inserted into the first sleeve portion 122. A first thrust washer 156 can be received into the first sleeve portion 122 on a side of the first ring gear 146 opposite to the second sleeve portion 124 to limit movement of the first ring gear 146 in an axial direction away from the second sleeve portion 124.

The second stage 132 can comprise a second sun gear 160, a second planet carrier 162, a plurality of second planet gears 164 and a second ring gear 166. The second sun gear 160 can be coupled to the first carrier body 148 for rotation therewith. In the particular example provided, the first carrier body 148 and the second sun gear 160 are integrally and unitarily formed in a suitable manner, such as compressed and sintered powdered metal. A pilot aperture 168 can be formed into the first carrier body 148 and/or the second sun gear 160 and can receive an end of the output shaft 92 of the motor assembly 14. The second planet carrier 162 can comprise a second carrier body 170 and a plurality of second pins 172 that are fixedly coupled to and extend from the second carrier body 170. Each of the second planet gears 164 can be rotatably disposed on a corresponding one of the second pins 172 and can have teeth 174 that are meshingly engaged with teeth of the second sun gear 160 and internal teeth 176 of the second ring gear 166. The second ring gear 166 can be received concentrically about the second planet gears 164.

The third stage 134 can include a third sun gear 180, a third planet carrier 182, a plurality of third planet gears 184 and a third ring gear 186. The third sun gear 180 can be coupled to the second carrier body 170 for rotation therewith. In the particular example provided, the second carrier body 170 and the third sun gear 180 are integrally and unitarily formed in a suitable manner, such as compressed and sintered powdered metal. A pilot pin 188 can extend from the second sun gear 160 and can be received into a bore 190 formed into the second carrier body 170 and/or the third sun gear 180. The third planet carrier 182 can comprise a third carrier body 192 and a plurality of third pins 194 that are fixedly coupled to and extend from the third carrier body 192. Each of the third planet gears 184 can be rotatably disposed on a corresponding one of the third pins 194 and can have teeth that are meshingly engaged with teeth of the third sun gear 180 and internal teeth of the third ring gear 186. The third ring gear 186 can be received concentrically about the third planet gears 184 and can be rotatably disposed within the first wall 46.

A second thrust washer 198 can be disposed axially between the transmission sleeve 104 and the gear case 32 and can limit axial movement of the second planet carrier 162 in a direction away from the motor assembly 14, as well as limit axial movement of the third ring gear 186 toward the motor assembly 14.

The output spindle 22 can be drivingly coupled to the third planet carrier 182 in any desired manner, such as directly coupled to the third carrier body 192. In the example provided, however, a conventional spindle lock assembly 200 is employed to drivingly couple the third planet carrier 182 to the output spindle 22 in a manner that permits the third planet carrier 182 to drive the output spindle 22 (in either rotational direction) but which inhibits the transmission of rotary power from the output spindle 22 to the third planet carrier 182 so that the output spindle 22 cannot be rotated to back-drive the reduction gearset 106. As the spindle lock assembly 200 is conventional in its configuration and operation, a detailed discussion of the spindle lock assembly 200 need not be provided herein. Briefly, the spindle lock assembly 200 comprises an anvil 204, a plurality of pins (not shown) and a ring structure 208, which is non-rotatably coupled to the housing assembly 12. The pins are disposed radially between the anvil 204 and the ring structure 208 and circumferentially between lugs (not shown) that extend axially from the third carrier body 192. Rotation of the third planet carrier 182 that would tend to drive the output spindle 22 causes corresponding rotation of the pins with the anvil 204 within the ring structure 208, while rotation of the output spindle 22 that would tend to drive the third planet carrier 182 causes rotation of the anvil 204 in a manner that urges the pins radially outwardly such that the pins wedge between the ring structure 208 and the anvil 204 to thereby lock the output spindle 22 to the housing assembly 12.

In the particular example provided, the ring structure 208 is coupled to the housing assembly 12 in a novel manner. More specifically, the ring structure 208 comprises a ring body 220 with a plurality of circumferentially spaced-apart teeth 222 that are meshingly engaged with the locking lugs 74 formed on the shoulder wall 48 of the gear case 32.

Bearings 230 can be received between the second wall 50 of the gear case 32 and the output spindle 22 and can support the output spindle 22 for rotation relative to the gear case 32.

With reference to FIGS. 2 and 5, the speed selector mechanism 108 can comprise a movable member 240, an actuator 242 and a shifter assembly 244.

The movable member 240 can be axially movable between a first position and a second position to cause the reduction gearset 106 to operate in a first overall gear ratio and a second overall gear ratio, respectively. In the example provided, the movable member 240 is the second ring gear 166 and is slidably disposed in the second sleeve portion 124 of the transmission sleeve 104 so as to be movable between the first position and the second position. Positioning the movable member 240 in the first position meshingly engages a plurality of second locking teeth 248 on the outer circumferential surface of the movable member 240 to the teeth 128 formed on the interior circumferential surface of the second sleeve portion 124 (to thereby non-rotatably couple the movable member 240 and the second ring gear 166 to the gear case 32 via the transmission sleeve 104), while positioning the movable member 240 in the second position meshingly engages the internal teeth 176 of the second ring gear 166 to the first locking teeth 152 formed on the first carrier body 148. It will be appreciated that the internal teeth 176 of the second ring gear 166 are decoupled from the first locking teeth 152 on the first carrier body 148 when the movable member 240 is in the first position, and that the second locking teeth 248 on the movable member 240 are decoupled from the teeth 128 on the second sleeve portion 124 when the movable member 240 is in the second position.

The actuator 242 can comprise a yoke 260 and a follower 262. The yoke 260 can have an input tab 270, a pair of pivot mounts 272 and a pair of follower mounts 274. The yoke 260 can be received over the transmission sleeve 104 such that the input tab 270 is disposed vertically in-line with the shifter aperture 58. The pivot mounts 272 pivotally couple the yoke 260 to the transmission sleeve 104 and can be positioned at a desired point between the input tab 270 and the follower mounts 274 so as to provide a desired ratio of movement between the input tab 270 and the follower mounts 274. In the particular example provided, the pivot mounts 272 are positioned so that the follower mounts 274 move in an axial direction (parallel to the longitudinal axis of the gear case 32) by an amount that is about equal to the amount in which the input tab 270 is moved. Each of the follower mounts 274 can comprise a slotted aperture 280 that can extend radially toward a point about which an associated one of the pivot mounts 272 pivotally couples the yoke 260 to the transmission sleeve 104. The follower 262 can be configured to transmit movement of the follower mounts 274 in an axial direction to the movable member 240. In the example provided, the follower 262 has follower body 290 and a pair of ears 292. The follower body 290 can be formed of wire in a generally half-moon shape and can be received in a circumferentially extending groove 294 formed about the movable member 240. Accordingly, it will be appreciated that the follower body 290 is received within the first wall 46 of the gear case 32. The ears 292 can extend radially outwardly from the follower body 290 through longitudinal slots 298 in the first wall 46 and can be received into the slotted apertures 280 in the follower mounts 274. It will be appreciated that the yoke 260 can be pivoted about the pivot mounts 272 to axially move the follower 262 so that the movable member 240 may be translated between the first and second positions. Portions of the ears 292 that extend radially outwardly of the yoke 260 can be received in the guide channels 54.

With reference to FIGS. 5 through 9, the shifter assembly 244 can comprise a selector switch 300, one or more detent springs 302 (FIG. 9), a switch fork 304 and first and second biasing springs 306 and 308. The selector switch 300 can be received in the shifter aperture 58 and can be configured to receive a manual switching input from a user of the tool 10. The selector switch 300 can comprise a switch member 312 and a wire form 314 that can be mounted to the switch member 312. The switch member 312 can define a pair of first rails 320, which can be oriented generally parallel to a direction in which the switch member 312 is translated relative to the housing assembly 12, a cross-member 322 and a pair of second rails 324. Each of the second rails 324 can be oriented relative to an associated one of the first rails 320 such that were the first rails 320 (extended) to intersect the second rails 324, they would create an outboard interior angle 326 that is less than about forty-five degrees. The wire form 314 can include a first bar member 330, a pair of second bar members 332 and a pair of detent members 334. The first bar member 330 can abut the cross-member 322, while each of the second bar members 332 can be abutted against an associated one of the first rails 320. Locking tabs 338 or other features can be employed to aid in fixing the second bar members 332 to the switch member 312. Each of the detent members 334 can be formed as a leaf spring that is connected to an end of a corresponding one of the second bar members 332 on a side opposite the first bar member 330. The detent members 334 are configured to compress inwardly when the switch member 312 is moved between various switch positions such that the distal ends 342 of the detent members 334 follow their associated second rail 324 to thereby axially extend the detent members 334 while reducing the extent to which they extend laterally outwardly from the switch member 312.

The detent springs 302 can be leaf springs that can be mounted to the detent mount 60 on the gear case 32. The detent springs 302 can be contoured to receive the detent members 334 of the wire form 314 so as to permit the selector switch 300 to be selectively positioned in a first switch position and a second switch position.

The switch fork 304 can be slidably mounted on the switch member 312 between a pair of fork rails 350 and can receive the input tab 270 on the yoke 260. The first and second biasing springs 306 and 308 can be positioned on opposite sides of the switch fork 304 and can abut opposite ends of the switch member 312. The first and second biasing springs 306 and 308 can cooperate to bias the switch fork 304 into a neutral position. Spring guides 354 can be integrated into the switch fork 304 or the switch member 312 to guide the first and second biasing springs 306 and 308.

In the particular example provided, the switch member 312 is formed in two pieces (i.e., an upper switch member 360 and a lower switch member 362). The upper switch member 360 can include the first and second rails 320 and 324, while the lower switch member 362 can include the cross-member 322 and the fork rails 350. The wire form 314 can be mounted to the upper switch member 360 such that the second bar members 332 abut the first rails 320 and the detent members 334 abut the second rails 324. The first and second biasing springs 306 and 308 can be assembled to the switch fork 304 and that assembly can be dropped into the lower switch member 362 such that the switch fork 304 is received between the fork rails 350. It will be appreciated that an upper side of the switch fork 304 is sized such that the switch fork 304 cannot drop completely through the fork rails 350. The upper and lower switch members 360 and 362 can be fixedly coupled to one another by any desired means to thereby capture the switch fork 304 and the first and second biasing springs 306 and 308 therebetween.

Figure 8:
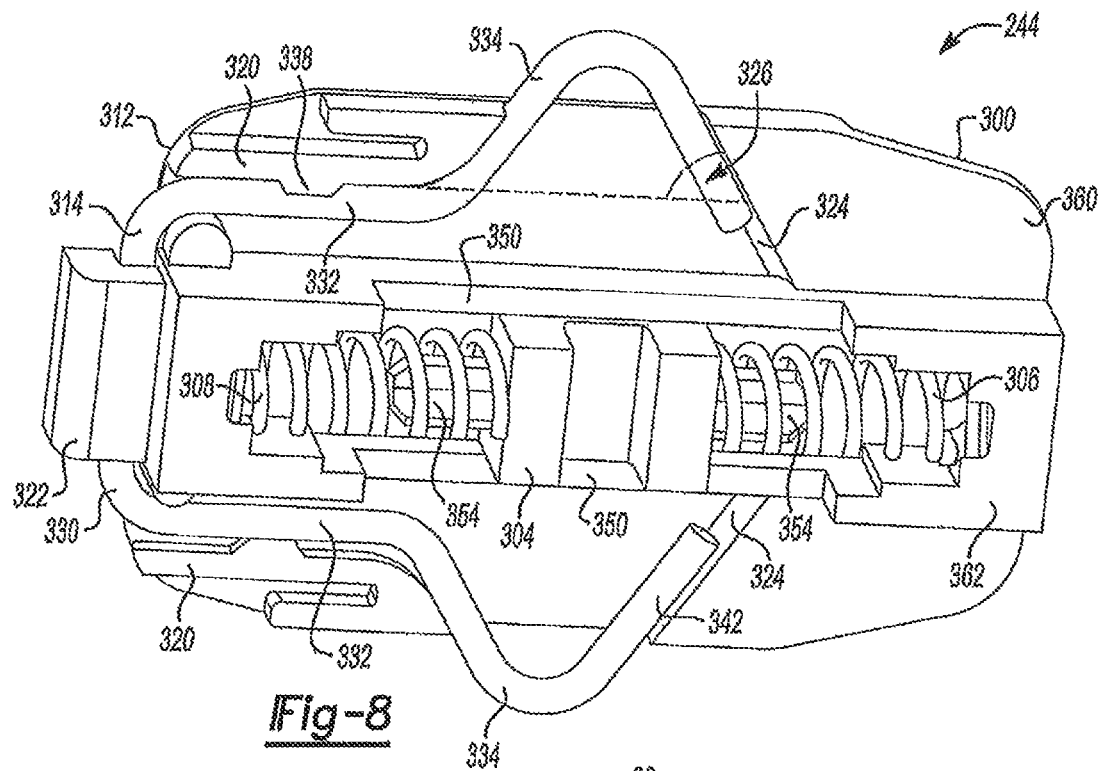
FIG. 8 is a bottom perspective view of the shifter assembly shown in FIG. 6.

With reference to FIGS. 2, 5 and 8, the switch member 312 can be axially translated from the first switch position to the second switch position to rotate the yoke 260 about the pivot mount 272 to thereby translate the follower 262 to cause the movable member 240 to move from the first position to the second position. In the event that the internal teeth 176 on the second ring gear 166 are not aligned to the first locking teeth 152 on the first carrier body 148, the switch member 312 may be positioned in the second switch position without fully translating the switch fork 304 such that the second biasing spring 308 is compressed. When the internal teeth 176 on the second ring gear 166 come into alignment with the first locking teeth 152 on the first carrier body 148, the force provided by the second biasing spring 308 will urge the yoke 260 to pivot about the pivot mount 272 such that the follower 262 will translate the movable member 240 into the second position.

The switch member 312 can also be axially translated from the second switch position to the first switch position to rotate the yoke about the pivot mount 272 to thereby translate the follower 262 to cause the movable member 240 to move from the second position to the first position. Should the second locking teeth 248 on the movable member 240 not be aligned to the teeth 128 on the second sleeve portion 124, the switch member 312 may be positioned in the first switch position without fully translating the switch fork 304 such that the first biasing spring 306 is compressed. When the second locking teeth 248 on the movable member 240 come into alignment with the teeth 128 on the second sleeve portion 124, the force provided by the first biasing spring 306 will urge the yoke 260 to pivot about the pivot mount 272 such that the follower 262 will translate the movable member 240 into the first position.

Returning to FIG. 2, the clutch assembly 20 can comprise a clutch profile 390, a plurality of clutch elements 392, a first thrust plate 394, a plurality of clutch springs 396, a spring follower 398, an adjustment nut 400, an adjustment collar 402, a second thrust plate 404 and a retaining ring 406. The clutch profile 390 can be fixedly coupled to (e.g., unitarily formed with) the third ring gear 186. The clutch elements 392 can be received through the clutch element apertures 70 in the shoulder wall 48 in the gear case 32 and can engage the clutch profile 390. In the particular example provided, the clutch elements 392 are single spherical balls, but it will be appreciated that other forms of clutch elements, including pins or stacked spherical balls, may be employed in the alternative. The first thrust plate 394 can be a washer that can be received over the clutch elements 392 on a side opposite the clutch profile 390. The clutch springs 396 can be helical compression springs that can be spaced circumferentially about the second wall 50 of the gear case 32. The spring follower 398, which can be slidably mounted on the second wall 50 of the gear case 32, can engage the keyway 82 (FIG. 4) in the second wall 50 to thereby inhibit relative rotation between the spring follower 398 and the gear case 32. A first end of the clutch springs 396 can be abutted against the first thrust plate 394 and a second, opposite end of the clutch springs 396 can be received into the spring follower 398. The adjustment nut 400 can be threadably engaged to the threaded portion 80 of the second wall 50 and can be employed to translate the spring follower 398 against the bias of the clutch springs 396 to thereby adjust a clutch spring force exerted against the clutch elements 392. The adjustment collar 402 can be non-rotatably but axially slidably mounted to the adjustment nut 400 in a conventional manner that permits a user to rotate the adjustment collar 402 (to thereby rotate the adjustment nut 400) without causing corresponding translation of the adjustment collar 402. The retaining ring 406 can be received in the retaining ring groove 86 and the second thrust plate 404 can be disposed on the second wall 50 axially between the retaining ring 406 and the adjustment collar 402 to thereby limit axial movement of the adjustment collar 402 relative to the gear case 32.

From the foregoing, it will be appreciated that the gear case 32 provides support for the transmission assembly 18, as well as and the output spindle 22 and the clutch assembly 20. It will also be appreciated that the second stage 132 can be configured such that it has an overall diameter or size that is smaller than the diameter or sizes of the first and third stages 130 and 134, which can permit the speed selector mechanism 108 to be integrated into the tool 10 in a nesting manner to thereby reduce the overall height of the tool 10.

Figure 10:
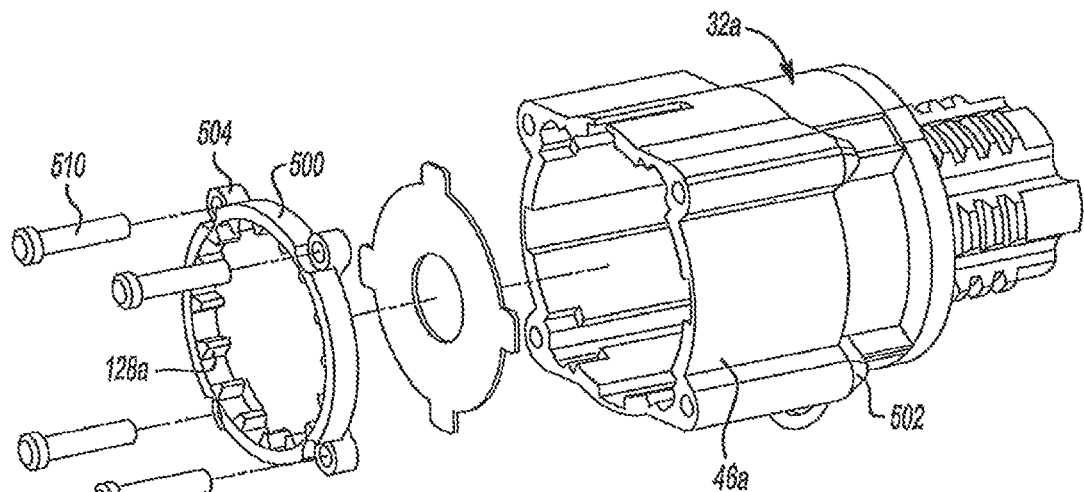
FIG. 10 is an exploded perspective view of a portion of another tool constructed in accordance with the teachings of the present disclosure.
Figure 11:
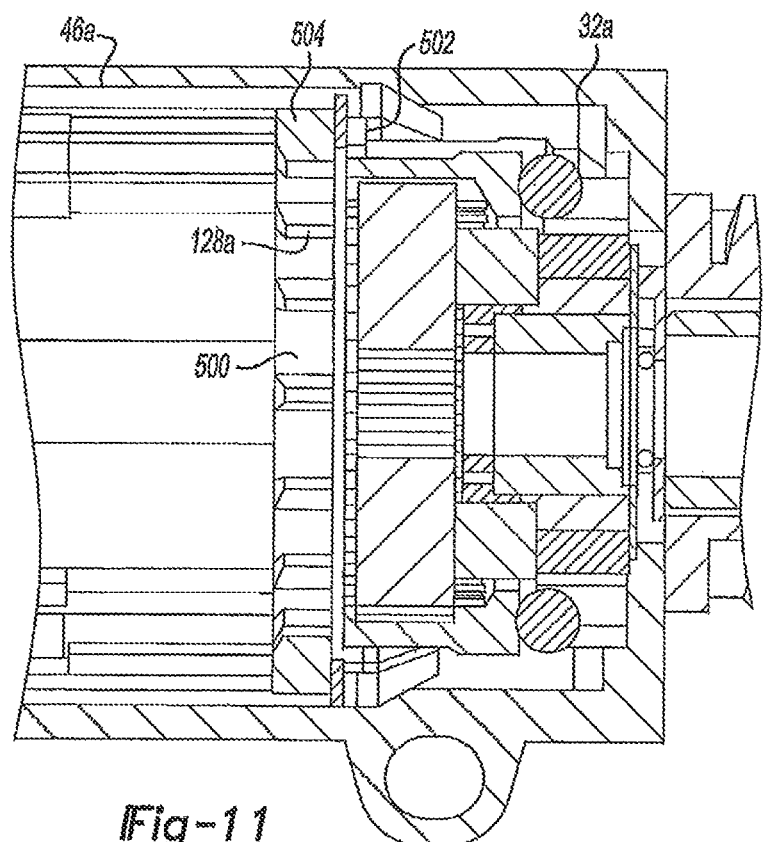
FIG. 11 is a longitudinal section view of a portion of the tool of FIG. 10.

While the tool 10 has been described and illustrated as having a transmission sleeve that is coupled to a gearcase, it will be appreciated that a tool constructed in accordance with the teachings of the present disclosure can be constructed somewhat differently. For example, the gear case 32a can be constructed so as to receive the reduction gearset 106 (FIG. 2) in its entirety as shown in FIGS. 10 and 11. In this example, the teeth 128a are formed on a ring-shaped structure 500 that is non-rotatably coupled to the first wall 46a of the gear case 32a. In the example provided, both the first wall 46a of the gear case 32a and the ring-shaped structure 500 have a plurality of circumferentially spaced-apart bosses 502 and 504, respectively, that axially abut one another. The bosses 504 on the ring shaped structure 500 can be matingly received in corresponding longitudinally extending grooves 506 formed on the interior surface of the first wall 46a such that receipt of the bosses 504 in the grooves 506 inhibits rotation of the ring shaped structure 500 relative to the gear case 32a. Additionally or alternatively, fasteners can be employed to non-rotatably couple and optionally fixedly couple the ring shaped structure 500 to the first wall 46a. In the example provided, the fasteners comprise threaded fasteners 510 that extend through the bosses 504 in the ring shaped structure 500 and threadably engage the bosses 502 in the first wall 46a, but it will be appreciated that various other types of fasteners, including rivets or pins, could be employed to fixedly couple the ring shaped structure 500 to the first wall 46a.

Figure 12:
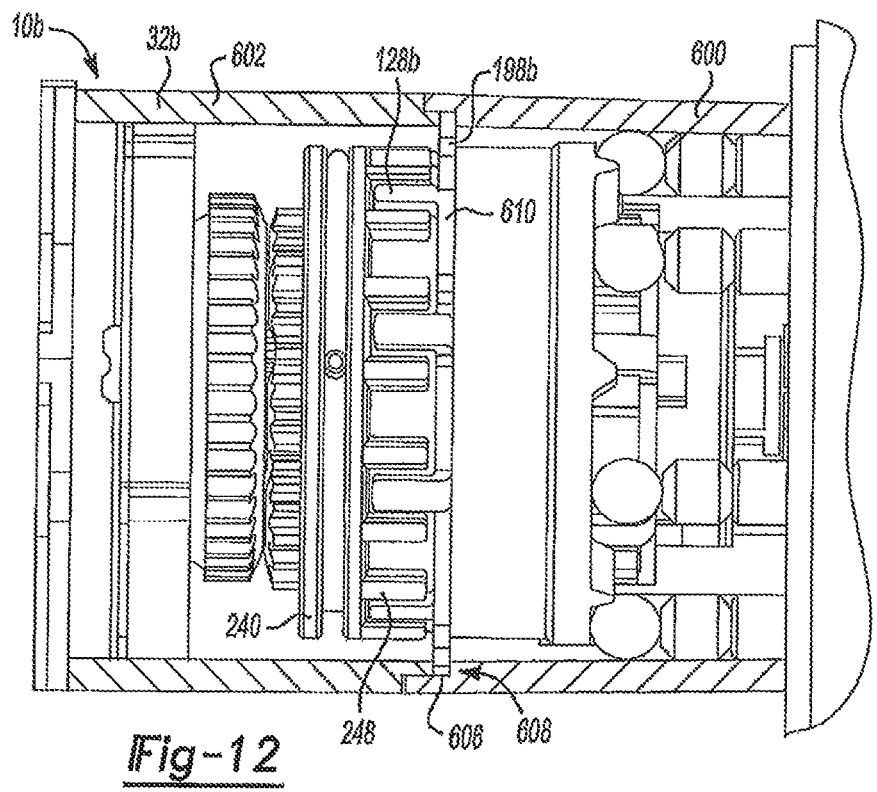
FIG. 12 is a partly sectioned right side elevation view of another tool constructed in accordance with the teachings of the present disclosure.
Figure 13:
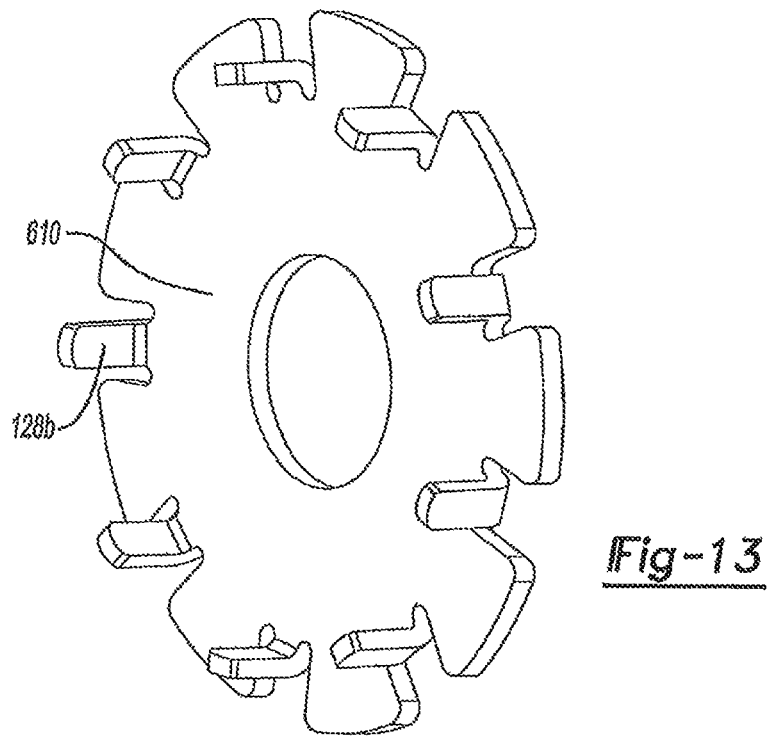
FIG. 13 is a perspective view of a portion of the tool of FIG. 12 illustrating a second thrust plate in more detail.

Another example is illustrated in FIGS. 12 and 13, in which the tool 10b has a two-piece gear case 32b and the teeth 128b are co-formed with the second thrust washer 198b. In this example, the gear case 32b comprises a front case portion 600 and a rear case portion 602 that abuts the front case portion 600. A circumferentially extending groove 606 is formed at the joint 608 where the front and rear case portions 600 and 602 abut one another. The circumferentially extending groove 606 can be formed in a non-circular manner, such as with a plurality of lobes or teeth (not shown). The second thrust washer 198b can have a thrust washer body 610 that can have a non-circular shape that can non-rotatably engage the gear case 32b when the thrust washer body 610 is received in the circumferentially extending groove 606. The teeth 128b can be integrally and unitarily formed with the thrust washer body 610 in an appropriate process, such as stamping, and can extend in an axial direction away from the thrust washer body 610. Accordingly, it will be appreciated that the second locking teeth 248 on the movable member 240 can engage the teeth 128b that are fixedly coupled to the second thrust washer 198b when the movable member 240 is positioned in the first position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Figure 14:
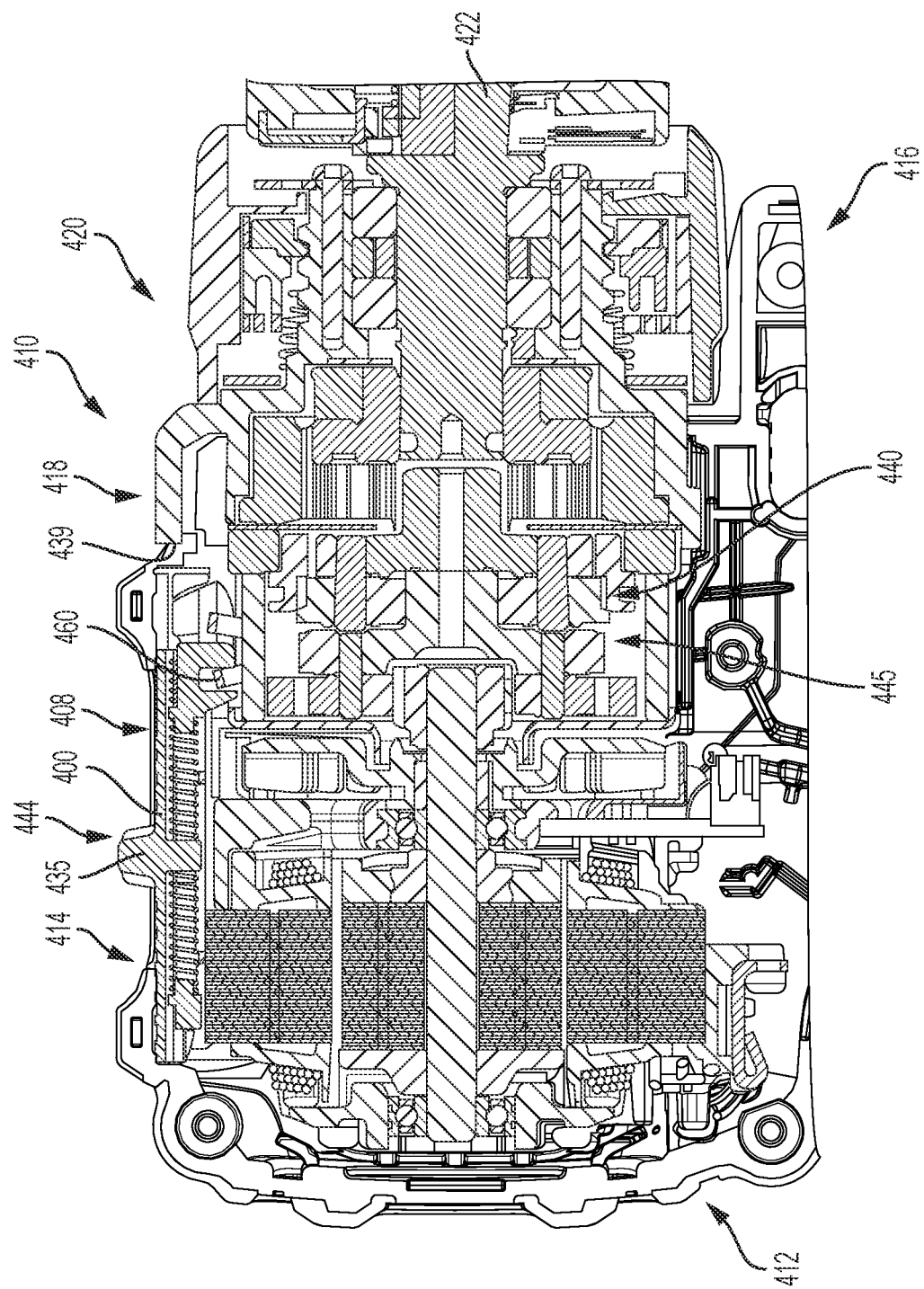
FIG. 14 is a side cross-sectional view of a portion of another exemplary tool constructed in accordance with the teachings of the present disclosure.
Figure 15:
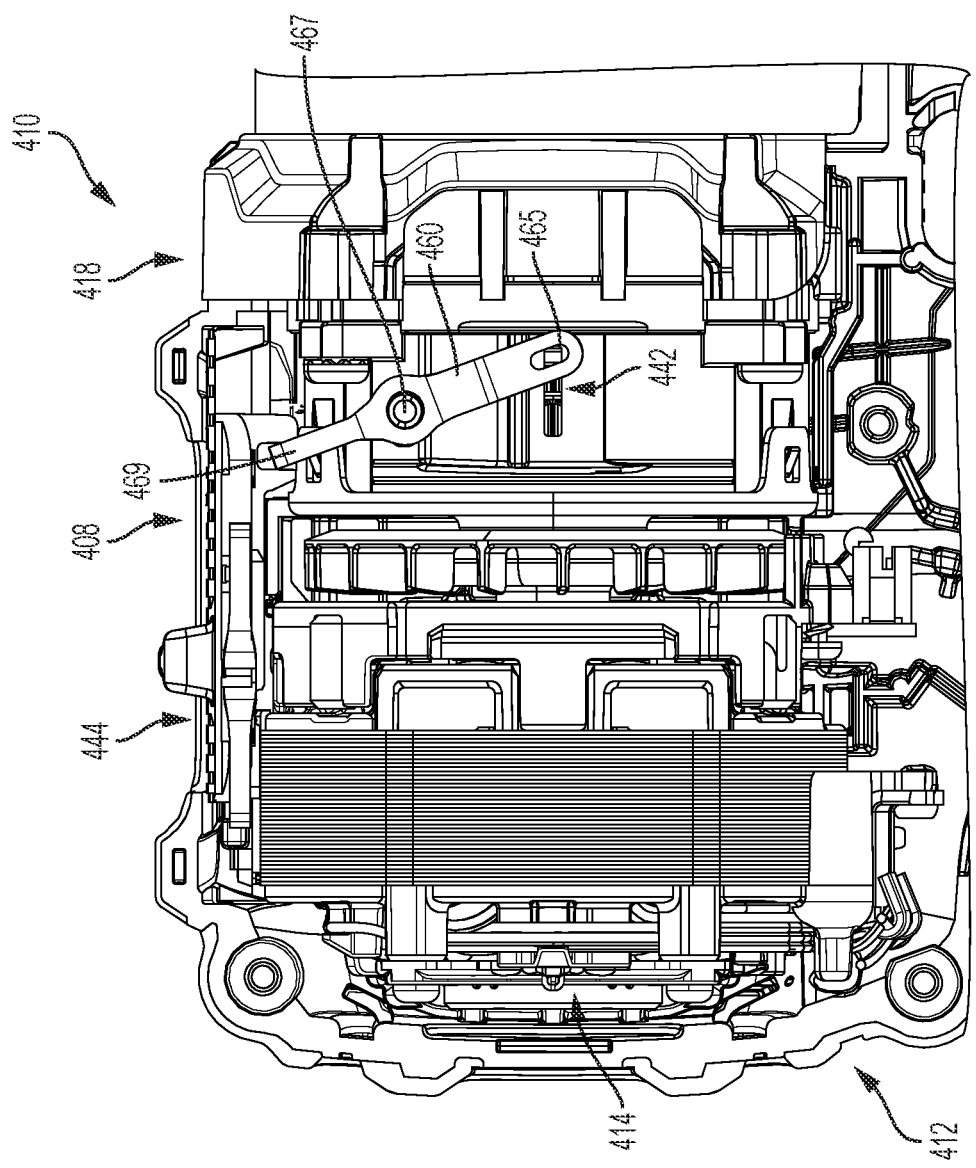
FIG. 15 is a side view of a portion of the tool of FIG. 1 with a portion of the tool housing removed.
Figure 16:
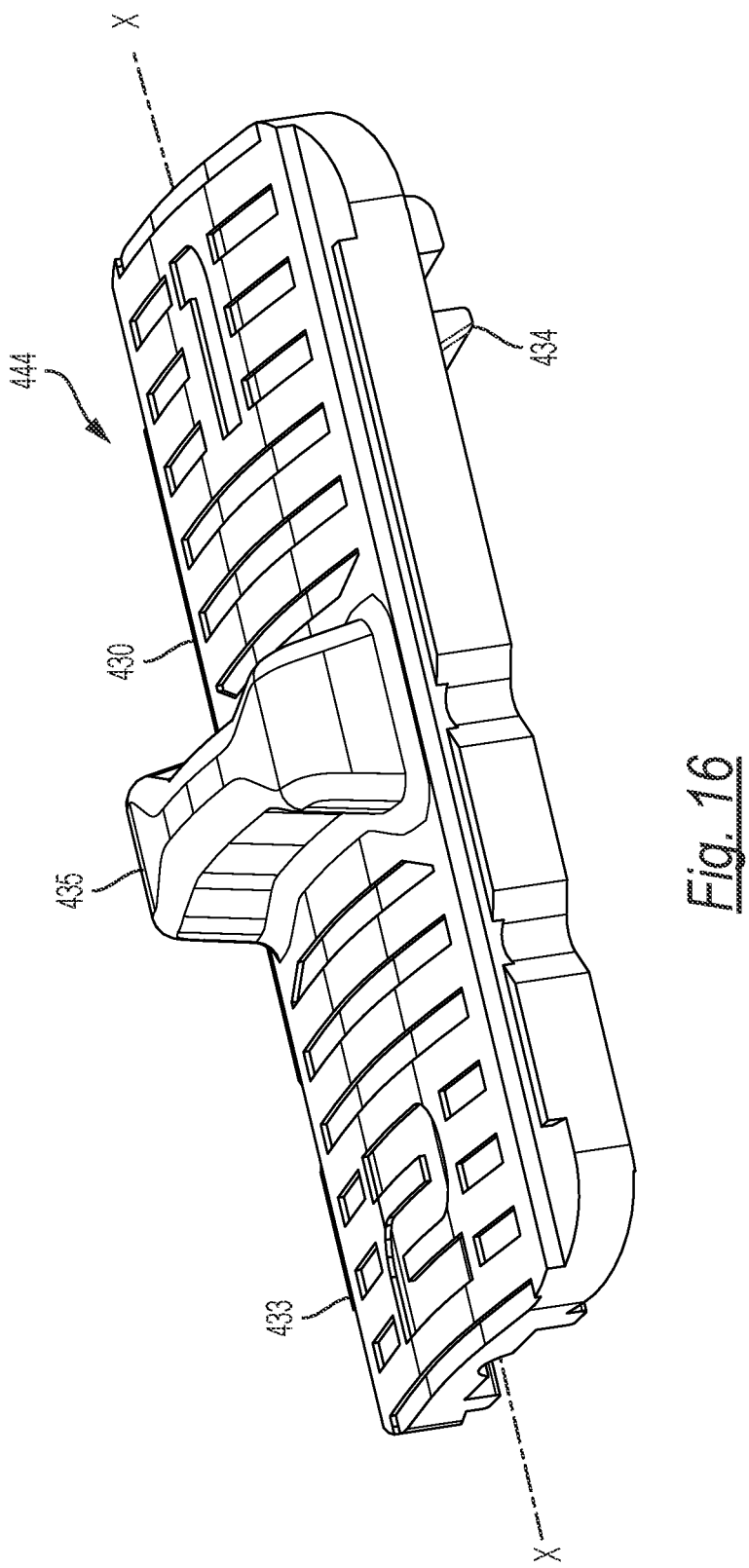
FIG. 16 is a top perspective view of a shifter assembly of the tool of FIG. 1.

Referring to FIGS. 14 and 15, in another exemplary embodiment, a power tool 410 includes a housing assembly 412, a motor assembly 414, a trigger assembly 416, a transmission assembly 418, a clutch assembly 420 and an output spindle 422 similar to the housing assembly 12, motor assembly 14, trigger assembly 16, transmission assembly 18, clutch assembly 20 and output spindle 22 of the tool 10. The transmission assembly 418 includes a transmission sleeve 404, similar to transmission sleeve 104, that contains a similar multi-speed (e.g., two speed) planetary gearset 445 as does the transmission sleeve 104.

A speed selector assembly 408 includes a shifter assembly 444, an actuator 442, and a movable member 440 that are operable to change a speed reduction setting of the planetary gearset 445. The movable member 440 comprises, e.g., a ring shaped member, that is axially movable between a first position (as shown in FIG. 14) and a second position (not shown) to cause the planetary gearset 445 to operate in a first speed reduction ratio and a second overall speed reduction ratio, respectively. The actuator 442 includes a yoke 460 and a follower (not shown) similar to the yoke 260 and a follower 262. The yoke 460 is received over the transmission sleeve 104 and has an input tab 469, a pair of pivot mounts 467 and a pair of follower mounts 465 and is pivotable relative to the transmission sleeve 104.

Referring also to FIGS. 16-20, the shifter assembly 444 includes a selector switch 430 extending along an axis X, a switch fork 434 slidably coupled to the selector switch 430, and first and second biasing springs 436, 438 that bias the switch fork 434 relative to the selector switch 430. The selector switch 430 is received in a shifter aperture 439 in the housing assembly 412. A top side 433 of the switch 430 includes a handle 435 that is configured to receive a manual switching input from a user of the tool 410. An underside 431 of the selector switch 430 defines a pair of first outer rails 450 and a pair of second inner rails 452, each oriented generally parallel to the axis X, which is the direction in which the selector switch 430 is translated relative to the housing assembly 412. The first outer rails 450 are configured to engage and ride along corresponding grooves in the housing assembly 412.

The second inner rails 452 each carry a first pair of downwardly and inwardly projecting L-shaped catches 454 at a rear end portion of the switch 430 and a second pair of downwardly and inwardly projecting L-shaped catches 456 at a front end portion of the switch 430. The second rails 452 and the first L-shaped catches 456 together define a pair of rearward grooves 458 and the second rails 452 and the second L-shaped catches 456 together define a pair of frontward grooves 459. The underside 431 of the switch 430 also defines a rearward central groove 462, a forward central groove 464, and a central protrusion 466 therebetween. The first biasing spring 436 is received in the rearward groove 458 and the second biasing spring 438 is received in the forward groove 459.

The switch fork 434 comprises an elongated body 470 extending along the axis X and having a frontward end 488, a rearward end 489, a top side 471 and an underside 484. The top side 471 defines a rearward pair of lateral rails 472, a frontward pair of lateral rails 474, and a pair of central wings 476 therebetween, each generally parallel to the axis X. The rearward pair of lateral rails 472 are slidably received in the rearward grooves 458 on the switch 430 and the forward pair of lateral rails 474 are slidably received in the forward grooves 459 of the switch 430 so that the switch fork 430 is slidably moveable along a length of the switch 430. The L-shaped catches 454, 456 help keep the switch fork 434 coupled to the switch 430, while allowing the switch fork 434 to translate along the axis X relative to the switch 430.

Figure 17:
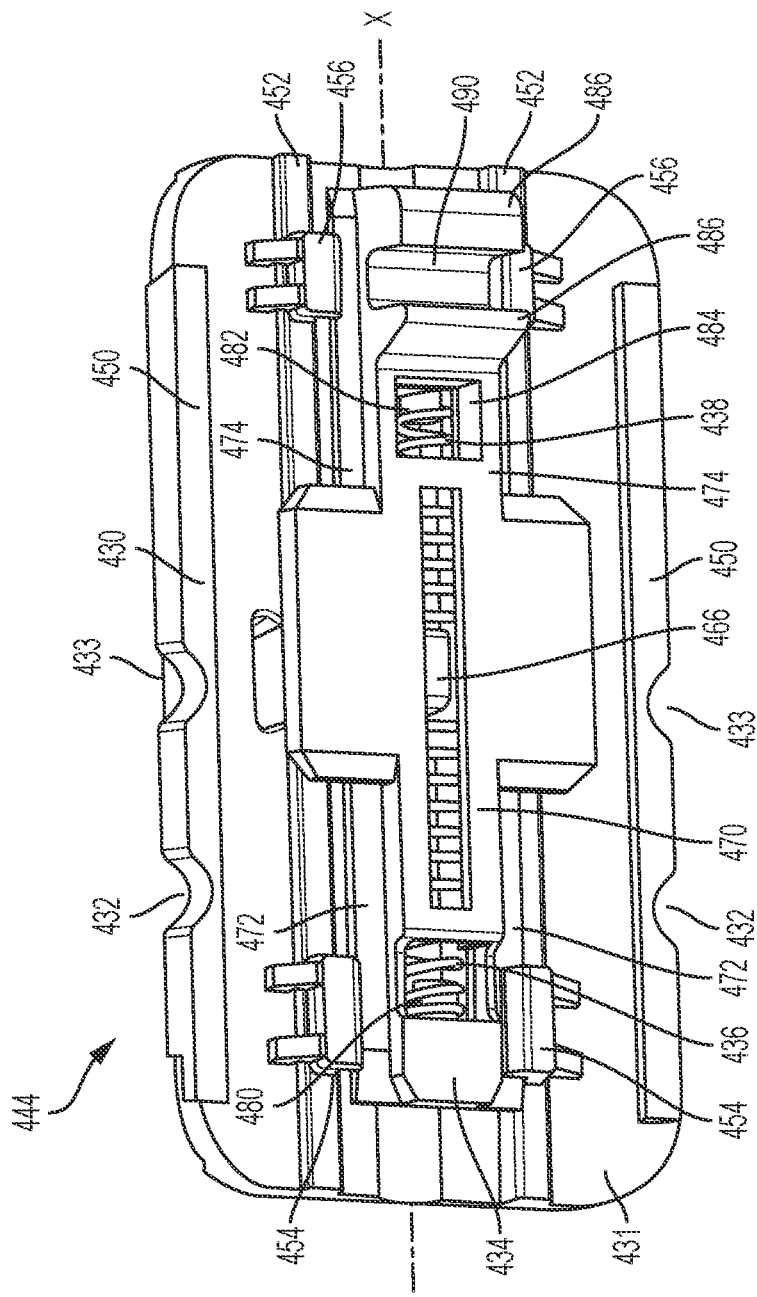
FIG. 17 is a bottom perspective view of the shifter assembly of FIG. 16.
Figure 18:
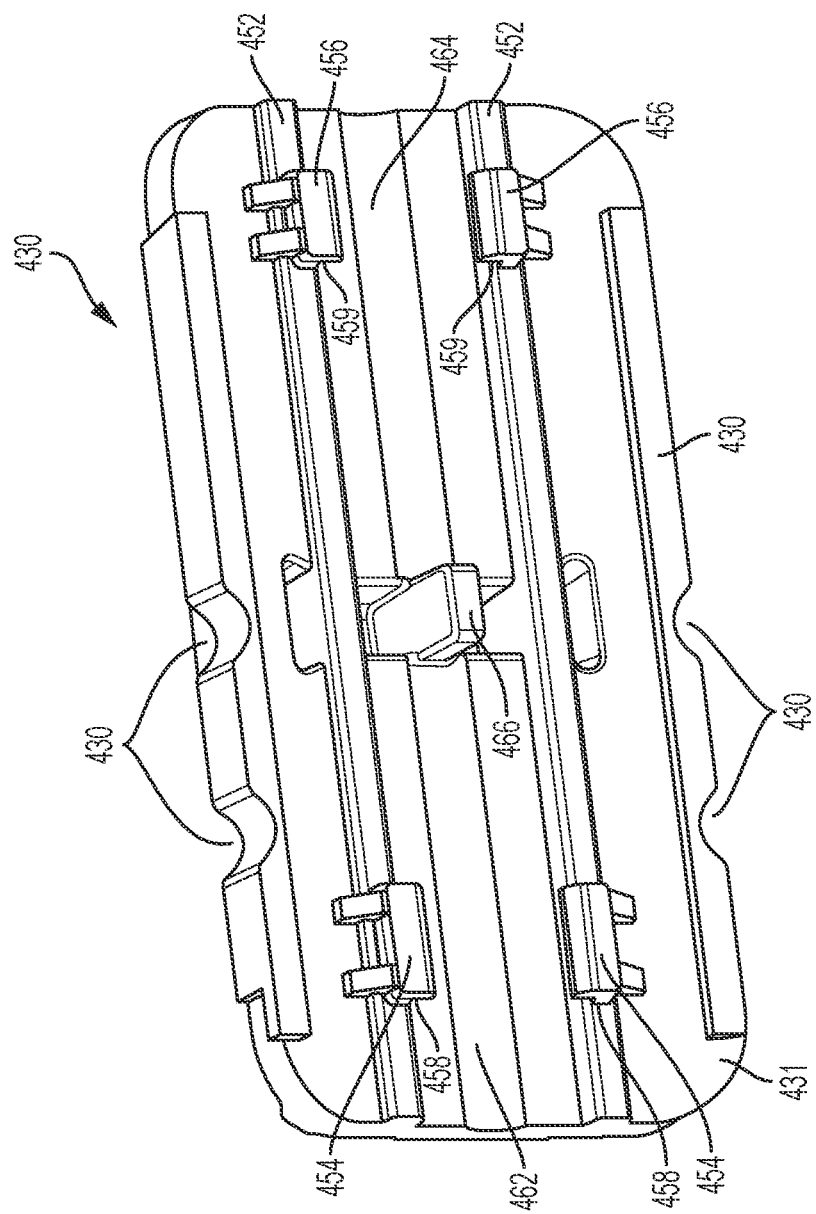
FIG. 18 is a bottom perspective view of a selector switch of the shifter assembly of FIG. 16.
Figure 19:
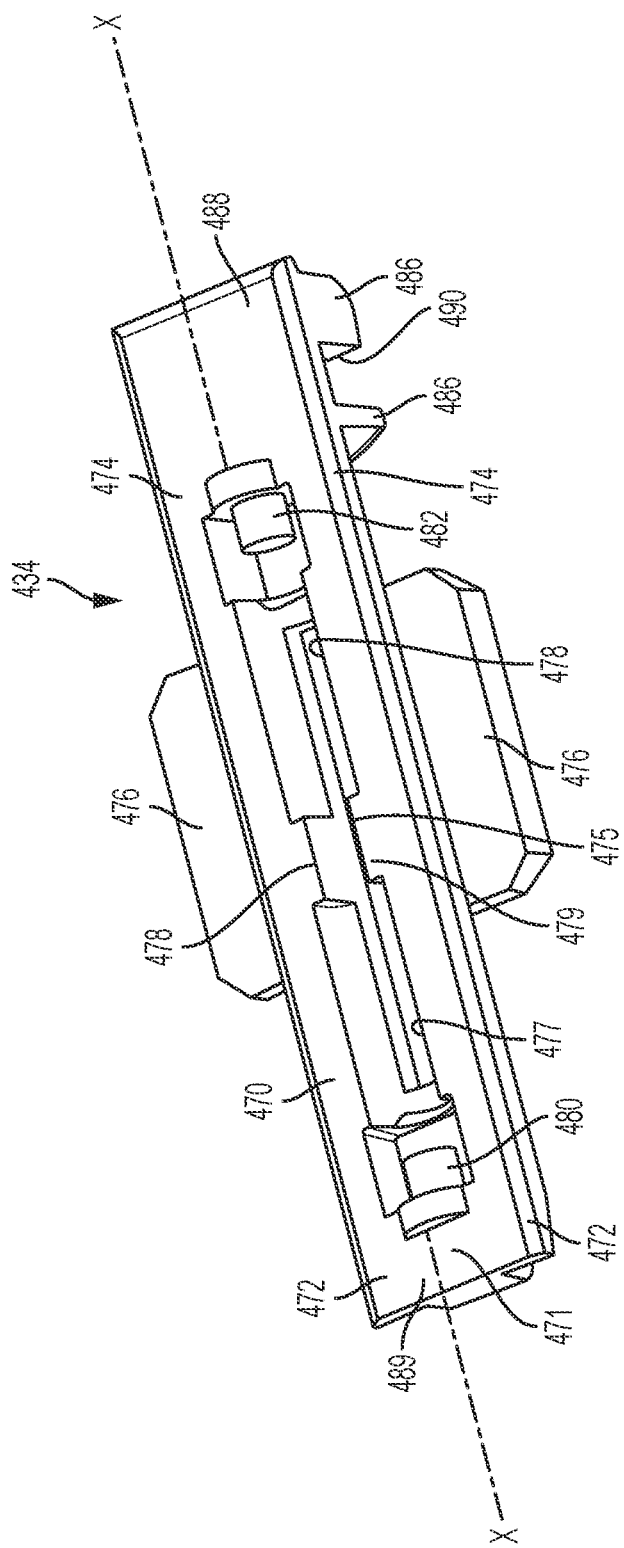
FIG. 19 is a top perspective view of a switch fork of the shifter assembly of FIG. 16.
Figure 20:
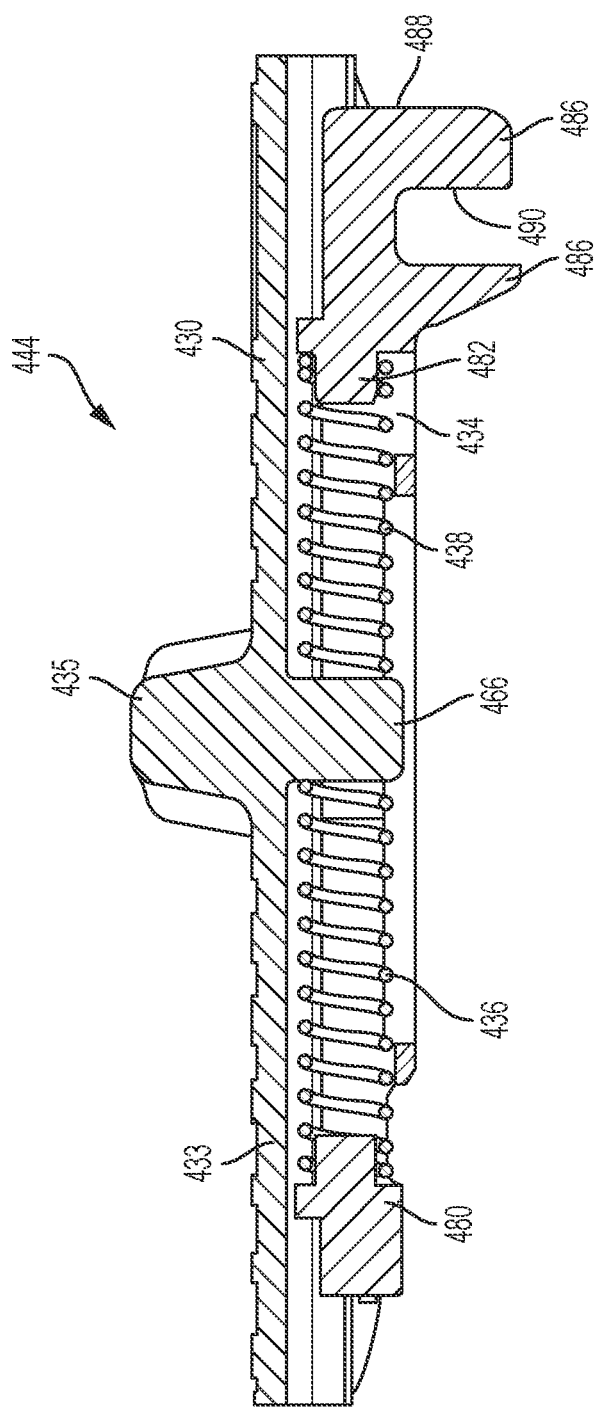
FIG. 20 is a side cross-sectional view of the shifter assembly of FIG. 16.

The switch fork 434 also defines a first or rearward slot 477 and a second or forward slot 478 extending along the axis X and separated by a pair of inward flanges 479 that defines a narrower slot center portion 475 that receives the central protrusion 466 on the switch 430. Extending into the slots 477, 478, adjacent the rearward and forward ends 488, 489 of the elongated body 470 are rearward and forward spring mounting pegs 480, 482, respectively. The first and second biasing springs 436, 438 are received in the rearward and forward slots 477, 478, respectively. Each spring 436, 438 has one end mounted on their respective rearward and forward mounting pegs 480, 482, and an opposite end that abuts against the inward flanges 479 on the switch fork 434 and the central protrusion 466 on the switch 430. When the switch fork 434 is coupled to the switch 430, the first and second biasing springs 436, 438 cooperate to bias the switch fork 434 into a central or neutral position relative to the switch 430, as shown in FIG. 17.

The frontward end 488 of the underside 484 of the switch fork 434 includes a pair of fork rails 486 with a fork groove 490 therebetween, each transvers to the axis X. The fork groove 490 receives the input tab 469 on the yoke 460, such that movement of the switch fork along the axis X causes the yoke 460 to pivot about the pivot 467, which in turn causes the movable member 440 to move axially between the first and second positions for the first and second gear ratios. Positioning the fork groove 490 at the frontward end 488 of the switch fork 434 enables the overall axial length of the transmission assembly 418 to be reduced, as compared to the transmission assembly 18 described above.

When assembled, the selector switch 430 is coupled to the housing assembly 412 for slidable movement relative to the housing assembly 412 parallel to the axis X, switch fork 434 is coupled to the selector switch 430 for slidable movement with or relative to the selector switch 430 along the axis X, and the input tab 469 of the yoke 460 is coupled to the fork groove 490 in the switch fork 434 for pivotal movement of the yoke 469 about the pivot 467. The selector switch 430 can be axially translated along the axis X between the first switch position to the second switch position to rotate the yoke 460 about the pivot 467 to thereby translate the follower to cause the movable member 440 to between the first position to the second position to change the gear ratio of the transmission.

Figure 21:
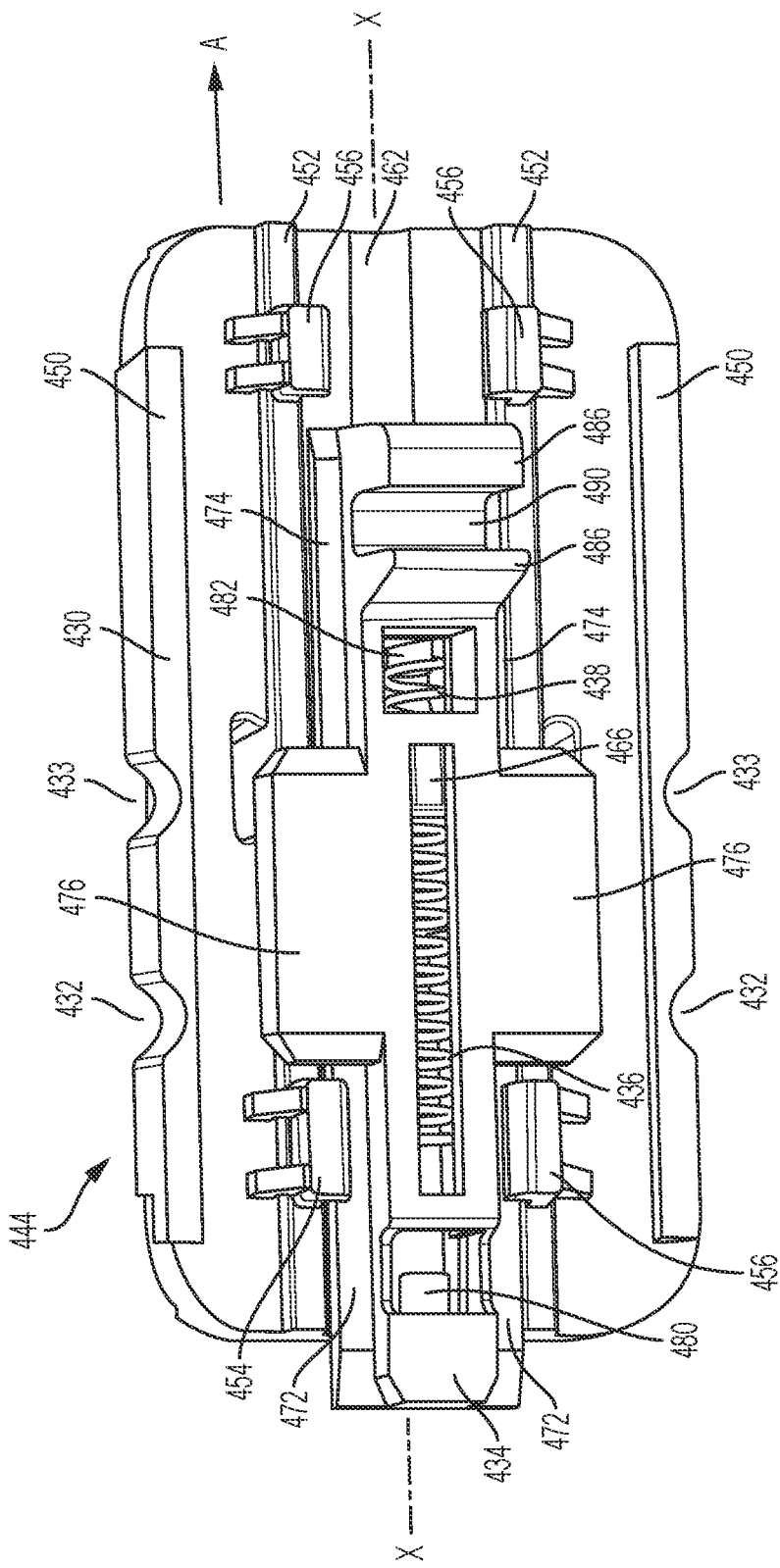
FIG. 21 is a bottom perspective view of the shifter assembly of FIG. 16 with the selector switch moved to a first position while the switch fork remains stationary.

Referring also to FIG. 21, when moving the selector switch 430 in direction A from the first switch position to the second switch position, if the internal teeth on the second ring gear 166 are not aligned to the first locking teeth 152 on the first carrier body 148, the selector switch 430 may be translated into the second switch position without fully translating the switch fork 434, such that either the second biasing spring 438 is compressed. When the internal teeth 176 on the second ring gear 166 come into alignment with the first locking teeth 152 on the first carrier body 148, the force provided by the second biasing spring 438 will urge the switch fork 434 to translate in the direction A back to a neutral position relative to the selector switch 430, causing the yoke 460 to pivot about the pivot mount 467 such that the follower will translate the movable member 440 into the second position to change the gear ratio.

Figure 22:
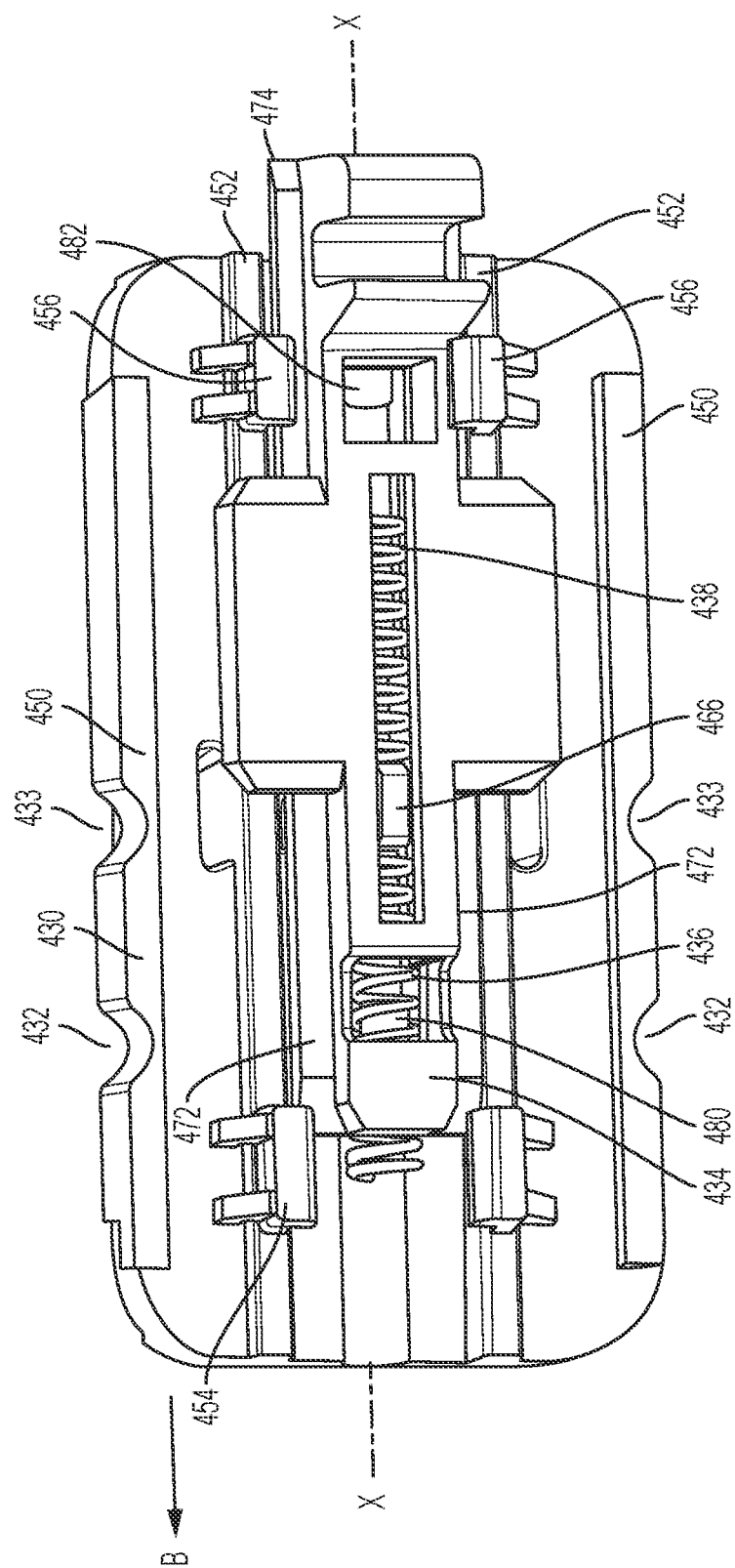
FIG. 22 is a bottom perspective view of the shifter assembly of FIG. 16 with the selector switch moved to a second position while the switch fork remains stationary.

Referring also to FIG. 22, when moving the selector switch 430 in direction B from the second switch position to the first switch position, if the second locking teeth 248 on the movable member 440 are not aligned to the teeth 128 on the second sleeve portion 124, the selector switch 430 may be translated into the first switch position without fully translating the switch fork 434, such that either the first biasing spring 436 is compressed. When the second locking teeth 248 on the movable member 240 come into alignment with the teeth 128 on the second sleeve portion 124, the force provided by the first biasing spring 436 will urge the switch fork 434 to translate in the direction B back to a neutral position relative to the selector switch 430, causing the yoke 460 to pivot about the pivot mount 467 such that the follower will translate the movable member 440 into the first position to change the gear ratio.

Figure 23:
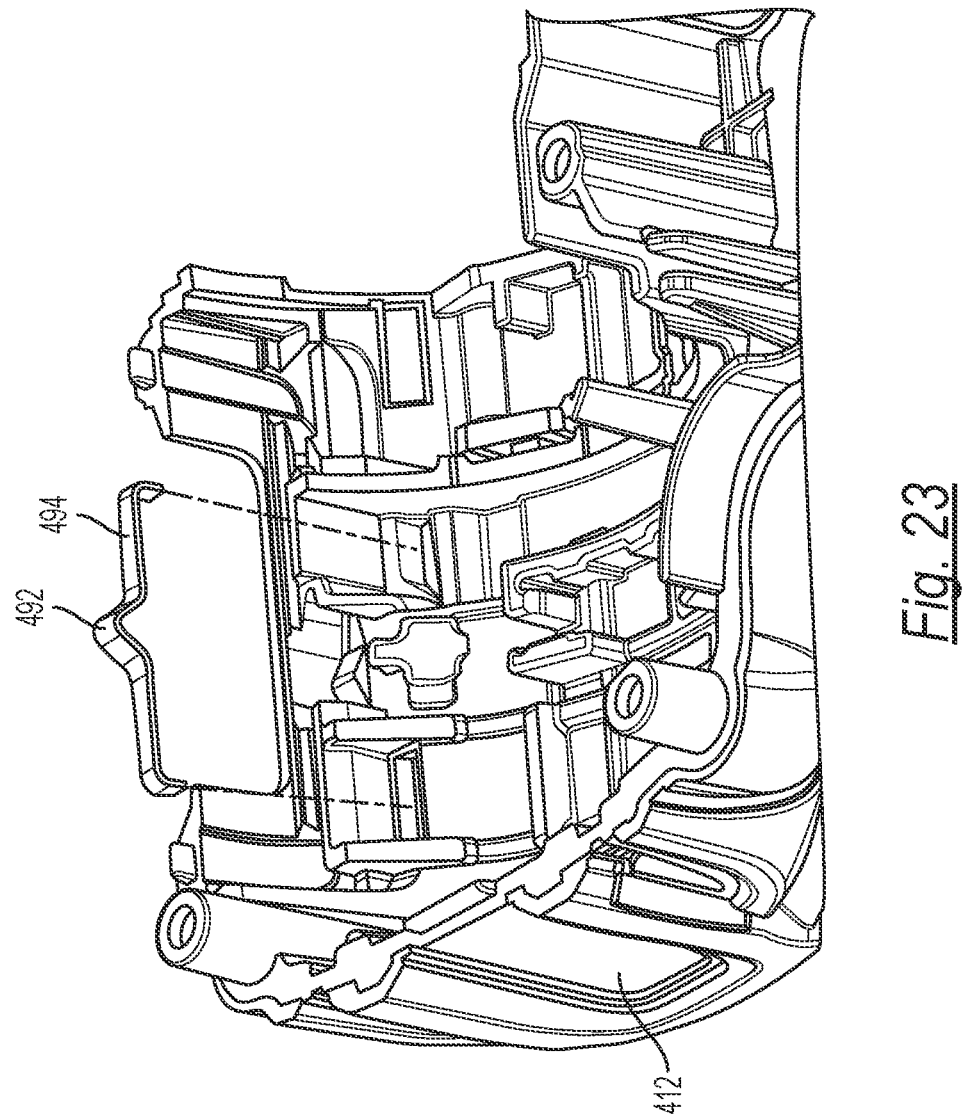
FIG. 23 is an exploded perspective view of a tool housing and detent spring of the tool of FIG. 14.
Figure 24B:
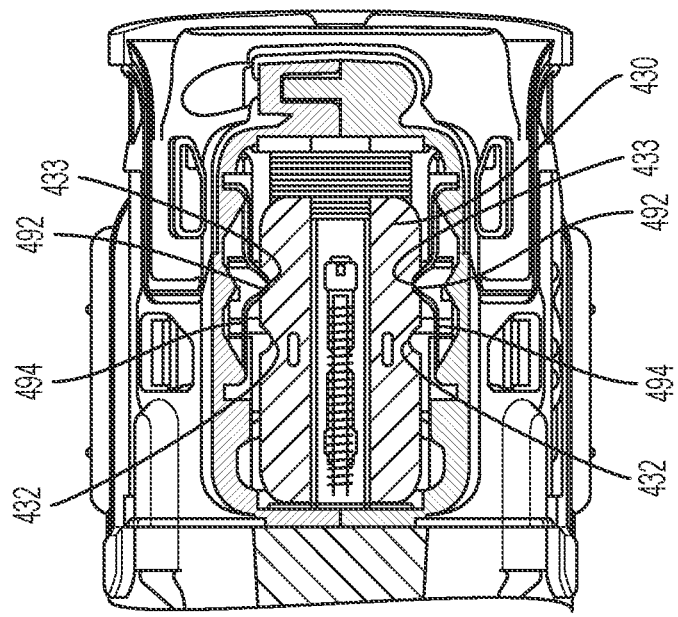
FIG. 24B is a top view of the selector switch, tool housing, and detent spring of FIGS. 16 and 23 with the selector switch in a second position.
Figure 24A:
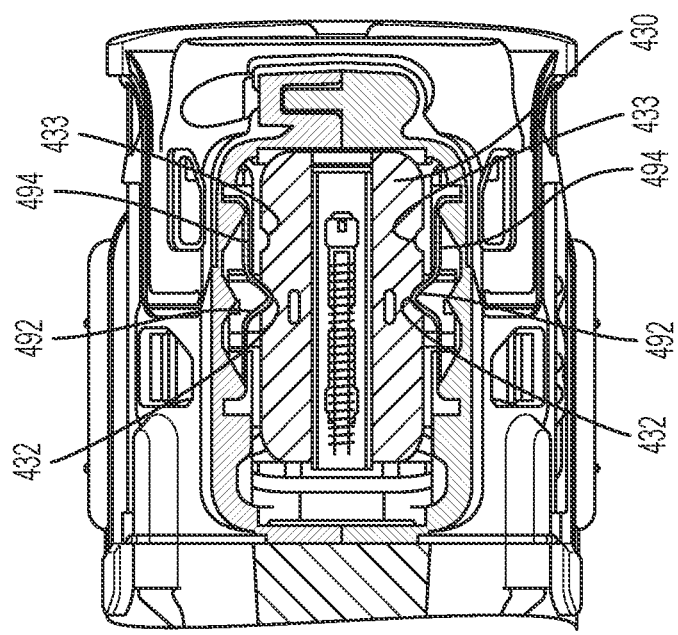
FIG. 24A is a top view of the selector switch, tool housing, and detent spring of FIGS. 16 and 23 with the selector switch in a first position.

Referring also to FIGS. 23-24B, to retain the selector switch 430 in the first and second positions, at least one first detent notch 432 and at least one second detent notch 433 defined in at least one lateral side of the selector switch 430. Each detent notch 432, 433 is configured to engage an apex 492 of at least one leaf spring 494 that is/are coupled in a stationary manner to the housing assembly 412 on at least one lateral side of the selector switch 430. The apex 492 engages the first detent notch 432 when the selector switch 430 is in the first position (FIG. 24A) and engages the second detent notch 433 when the selector switch 430 is in the second position (FIG. 24B). In the illustrated embodiment, the selector switch has a pair of first detent notches 432 and a pair of second detent notches 433 that engage apexes 492 of a pair of leaf springs 494 on opposite lateral sides of the selector switch 430. In other embodiments, the selector switch 430 may have only a single first and second detent notch that engage a single apex of a single leaf spring. In yet other embodiments, the leaf spring may be coupled to the selector switch 430 and may engage detent notches in the housing, and the spring may be a different type of resilient member such as a compression spring or a wire.

Numerous modifications may be made to the exemplary implementations described above. These and other implementations are within the scope of the following claims.

What is claimed is:

1. A power tool comprising:
   a tool housing;
   an output member received at least partially in the tool housing;
   a motor received in the tool housing;
   a speed reduction gearset received in the tool housing, defining a longitudinal axis, and configured to transmit rotational motion from the motor to the output member, the gearset being operable in at least a first speed setting that causes the output member to rotate at a first output speed relative to a speed of the motor, and a second speed setting that causes the output member to rotate at a different second output speed relative to the speed of the motor; and
   a speed selector assembly configured to enable a user to change operation of the gearset between the first speed setting and the second speed setting, the speed selector assembly including
   an upper switch at least partially exposed from the tool housing and slidable between at least a first selector position that corresponds to selection of the first speed setting and a second selector position that corresponds to selection of the second speed setting,
   a lower switch slidably coupled to the upper switch and moveable relative to the upper switch between a first switch position that corresponds to the first speed setting and a second switch position that corresponds to the second speed setting,
   a movable member moveable by the lower switch relative to the gearset between a first gearset position that causes the gearset to operate in the first speed setting and a second gearset position that causes the gearset to operate in the second speed setting, and
   at least one biasing spring disposed between the upper switch and the lower switch to cooperatively bias the lower switch to a neutral position relative to the upper switch,
   wherein when the upper switch is moved in a first direction from the first selector position to the second selector position, the at least one spring urges the lower switch to move from the first switch position to the second switch position and the movable member to move from the first gearset position to the second gearset position upon alignment of the gearset,
   wherein when the upper switch is moved in a second direction opposite the first direction from the second selector position to the first selector position, the at least one spring urges the lower switch to move from the second switch position to the first switch position and the movable member to move from the second gearset position to the first gearset position upon alignment of the gearset;
   wherein the speed reduction gearset is a planetary gearset;
   wherein the moveable member has an at least partial ring shape with a plurality of locking teeth;
   wherein the moveable member is non-rotably coupled to the housing when in the first gearset position and is coupled to a planet carrier of the gearset for common rotation when in the second gearset position.

2. The power tool of claim 1, wherein the upper switch, the lower switch, and the movable member are movable parallel to the longitudinal axis.

3. The power tool of claim 1, wherein the upper switch and the lower switch include cooperating rails and grooves that enable sliding of the lower switch relative to the upper switch along the longitudinal axis while inhibiting separation of the lower switch from the upper switch.

4. The power tool of claim 1, wherein the movable member is coupled to one end of the lower switch.

5. The power tool of claim 1, wherein the at least one biasing spring comprises a first spring and a second spring.

6. The power tool of claim 5, wherein the first spring is positioned between a first end of the upper switch and a center portion of the upper switch and the second spring is positioned between an opposite second end of the upper switch and the center portion of the upper switch.

7. The power tool of claim 1, wherein one of the upper switch or the lower switch includes a slot that receives the at least one spring.

8. The power tool of claim 7, wherein the other of the upper switch and the lower switch includes a protrusion that is received in the slot and that engages the at least one spring.

9. A power tool comprising:
   a tool housing;
   an output member received at least partially in the tool housing;
   a motor received in the tool housing;
   a speed reduction gearset received in the tool housing, defining a longitudinal axis, and configured to transmit rotational motion from the motor to the output member, the gearset being operable in at least a first speed setting that causes the output member to rotate at a first output speed relative to a speed of the motor, and a second speed setting that causes the output member to rotate at a different second output speed relative to the speed of the motor; and
   a speed selector assembly configured to enable a user to change operation of the gearset between the first speed setting and the second speed setting, the speed selector assembly including
   an upper switch at least partially exposed from the tool housing and slidable between at least a first selector position that corresponds to selection of the first speed setting and a second selector position that corresponds to selection of the second speed setting, a lower switch slidably coupled to the upper switch and moveable relative to the upper switch between a first switch position that corresponds to the first speed setting and a second switch position that corresponds to the second speed setting, a movable member moveable by the lower switch relative to the gearset between a first gearset position that causes the gearset to operate in the first speed setting and a second gearset position that causes the gearset to operate in the second speed setting, and at least one biasing spring disposed between the upper switch and the lower switch to cooperatively bias the lower switch to a neutral position relative to the upper switch, wherein when the upper switch is moved in a first direction from the first selector position to the second selector position, the at least one spring urges the lower switch to move from the first switch position to the second switch position and the movable member to move from the first gearset position to the second gearset position upon alignment of the gearset, and wherein when the upper switch is moved in a second direction opposite the first direction from the second selector position to the first selector position, the at least one spring urges the lower switch to move from the second switch position to the first switch position and the movable member to move from the second gearset position to the first gearset position upon alignment of the gearset wherein the upper switch and the lower switch include cooperating rails and grooves that enable sliding of the lower switch relative to the upper switch along the longitudinal axis while inhibiting separation of the lower switch from the upper switch wherein the lower switch includes a shift fork.

10. The power tool of claim 9, wherein the speed selector assembly further comprises a yoke coupled between the shift fork and the moveable member, the yoke configured to pivot upon movement of the lower switch.

* * * * *